United States Patent
Kobayashi et al.

(10) Patent No.: US 10,571,708 B2
(45) Date of Patent: Feb. 25, 2020

(54) BEAM SHAPING DEVICE AND LASER OSCILLATOR

(71) Applicant: MITSUBISHI ELECTRIC CORPORATION, Chiyoda-ku, Tokyo (JP)

(72) Inventors: Nobutaka Kobayashi, Tokyo (JP); Chisako Oda, Tokyo (JP); Daiji Morita, Tokyo (JP); Junichi Nishimae, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 16/071,790

(22) PCT Filed: Jan. 13, 2017

(86) PCT No.: PCT/JP2017/001021
§ 371 (c)(1),
(2) Date: Jul. 20, 2018

(87) PCT Pub. No.: WO2017/138298
PCT Pub. Date: Aug. 17, 2017

(65) Prior Publication Data
US 2019/0265495 A1    Aug. 29, 2019

(30) Foreign Application Priority Data
Feb. 9, 2016  (JP) ................. 2016-022643

(51) Int. Cl.
*G02B 27/09*   (2006.01)
*G02B 27/30*   (2006.01)
*G02B 3/00*    (2006.01)

(52) U.S. Cl.
CPC ............ *G02B 27/30* (2013.01); *G02B 3/005* (2013.01); *G02B 3/0025* (2013.01);
(Continued)

(58) Field of Classification Search
CPC ............... G02B 27/30; G02B 27/0961; G02B 27/0966; G02B 27/0955
See application file for complete search history.

(56) References Cited

U.S. PATENT DOCUMENTS

| 5,861,992 A | 1/1999 | Gelbart |
| 2002/0067549 A1 | 6/2002 | Tawa et al. |
| 2013/0112667 A1* | 5/2013 | Holmgren ............ H01L 21/268 219/121.6 |

FOREIGN PATENT DOCUMENTS

| JP | 7-98402 A | 4/1995 |
| JP | 2000-89161 A | 3/2000 |

(Continued)

OTHER PUBLICATIONS

International Search Report (PCT/ISA/210) dated Mar. 14, 2017, by the Japanese Patent Office as the International Searching Authority for International Application No. PCT/JP2017/001021.

*Primary Examiner* — Joseph P Martinez
(74) *Attorney, Agent, or Firm* — Buchanan Ingersoll & Rooney PC

(57) ABSTRACT

A beam shaping device includes an SAC and an FAC. The SAC is placed between an LD bar and the FAC. A first incident surface and a first exit surface are formed in the SAC. The first incident surface includes a plurality of incident-side lens surfaces aligned in a slow axis direction X. The incident-side lens surfaces each have, in section orthogonal to a fast axis direction Y, a shape convexed toward the outside of the SAC and, in section orthogonal to the slow axis direction X, a shape concaved toward the inside of the SAC. The shape of the first incident surface and
(Continued)

the shape of the first exit surface in section orthogonal to the slow axis direction X are concentric arcs having a point on an emission end surface of a light emitting layer as the center.

17 Claims, 12 Drawing Sheets

(52) U.S. Cl.
CPC ......... *G02B 3/0031* (2013.01); *G02B 3/0068* (2013.01); *G02B 3/0075* (2013.01); *G02B 27/0961* (2013.01); *G02B 27/0966* (2013.01)

(56) References Cited

FOREIGN PATENT DOCUMENTS

| | | |
|---|---|---|
| JP | 2011-169969 A | 9/2011 |
| JP | 2015-503221 A | 1/2015 |

* cited by examiner

BEAM SHAPING DEVICE AND LASER OSCILLATOR

TECHNICAL FIELD

The present invention relates to a beam shaping device and laser oscillator configured to collimate laser light from a light emission device.

BACKGROUND ART

Of lasers used to, for example, cut a member and weld members together, YAG lasers, $YVO_4$ lasers, fiber lasers, and other similar lasers have a semiconductor laser (laser diode: LD) as an excitation light source. For example, excitation light of a semiconductor laser whose wavelength is in an 800-nm band or a 900-nm band is irradiated onto a laser medium directly or via an optical fiber to be converted into oscillating light whose wavelength is in a 1,000-nm band. Cases of using laser light of a semiconductor laser whose wavelength is in a 900-nm band or a 1,000-nm band directly to process a member are also found in recent years.

High-energy laser light is required to process a member, and power enhancement is consequently demanded of semiconductor lasers that generate excitation light as well. An LD bar in which a plurality of light emitting layers (active layer stripes) of semiconductor elements are aligned in a one-dimensional direction is thus used in order to enhance the power of a semiconductor laser. For example, ten to fifty beams of laser light are emitted in parallel from an end surface of each light emitting layer in an LD bar having a width of approximately 10 nm and including light emitting layers each of which is from 50 μm to 200 μm in width and which are laid side by side at equal pitches. A power of several tens of watts is obtained from such an LD bar and, in recent years, even LD bars having a power of several hundreds of watts are available.

When laser light emitted from the LD bar described above is used by, for example, causing the laser light to enter an optical fiber or irradiating the laser light directly onto a processing object, it is common to parallelize, that is, collimate, the laser light once. A light emitting layer of a semiconductor element is approximately 1 μm in thickness while the width of the light emitting layer is from 50 μm to 200 μm, which leads to a significant difference in the divergence angle of the laser light between a width direction of the light emitting layer and a thickness direction of the light emitting layer, with the divergence angle in the width direction being from 7 deg to 11 deg and the divergence angle in the thickness direction being from 45 deg to 60 deg. The thickness direction, in which the divergence angle of the laser light is large, is called a fast axis direction, and the width direction, in which the divergence angle of the laser light is small, is called a slow axis direction.

A beam shaping device has hitherto been proposed in which, in order to collimate a plurality of beams of laser light emitted from a semiconductor laser, cylindrical lenses are placed separately for the fast axis direction and for the slow axis direction, and a plurality of cylindrical lenses corresponding to the respective beams of laser light are arranged to form a cylindrical lens array for the slow axis direction (see Patent Literature 1, for example). In this type of beam shaping device of the related art, beams of laser light emitted from a plurality of light emitting layers can be collimated individually in the slow axis direction, and laser light in the fast axis direction and laser light in the slow axis direction can be collimated separately as well. A collimator lens in the fast axis direction is called a fast axis collimator (FAC), and a collimator lens in the slow axis direction is called a slow axis collimator (SAC).

Another beam shaping device has hitherto been proposed in which, in order to collimate laser light emitted from an LD bar, beams of laser light transmitted through an FAC are each rotated by 90 deg about an optical axis by a light path conversion element to be switched between the fast axis direction and the slow axis direction, and then enter an SAC (see Patent Literature 2, for example). In this type of beam shaping device of the related art, differences in the quality of laser light between the fast axis direction and the slow axis direction, namely, differences in laser light width and in divergence angle, can be kept small when the laser light is irradiated onto a laser medium or when the laser light enters an optical fiber.

CITATION LIST

Patent Literature

[PTL 1] U.S. Pat. No. 5,861,992 A
[PTL 2] JP 07-98402 A

SUMMARY OF INVENTION

Technical Problem

The divergence angle of laser light emitted from a semiconductor laser is larger in the fast axis direction than in the slow axis direction. The FAC is therefore positioned closer to an LD bar than the SAC is in the beam shaping devices described in Patent Literature 1 and Patent Literature 2.

With the advance of power enhancement of LD bars in recent years, even LD bars having a power of several hundreds of watts are available. In an LD bar of this level of high power, the number of light emitting layers is large, and the pitch between the light emitting layers is that much narrower. For instance, the pitch between light emitting layers each having a width of 100 μm is 200 μm, and a number of light emitting layers close to fifty are laid side by side in a 10 mm-wide LD bar. This makes the proportion of the width of a light emitting layer to the pitch between light emitting layers, namely, a fill factor, high in a high-power LD bar.

In an LD bar in which light emitting layers are aligned in the slow axis direction, a narrow pitch between the light emitting layers causes beams of laser light from adjacent light emitting layers to start overlapping each other at a relatively short distance from an end surface of the LD bar. Consequently, an SAC is required to have a short focal distance and is required to be a minuter cylindrical lens array in order to collimate beams of laser light before an overlap between the beams of laser light takes place. In this case, a focal distance of an FAC placed between the LD bar and the SAC is even shorter and the curvature radius of a lens surface of the FAC is as small as approximately 0.1 mm in some cases. This makes the FAC a very thin and elongated cylindrical lens because an FAC is required to have a length equal to or more than the width of an LD bar. The handling of such a lens is difficult and requires utmost care. In addition, the small curvature radius of the lens surface of the FAC means that the FAC take a lot of work to mold and polish, thereby making the manufacturing of the FAC difficult. If power enhancement and the narrowing of the pitch between light emitting layers in an LD bar are advanced further in the future, the difficulty in the handling and manufacturing of an SAC and an FAC is expected to rise further.

When an SAC and an FAC are designed to be large in size in order to make the SAC and the FAC easy to handle and manufacture, the distance from an LD bar to the SAC is expanded, and laser light enters not only a cylinder surface of a cylindrical lens array serving as the SAC that is opposed to a light emitting layer but also its adjacent cylinder surface. A portion of the laser light that enters the adjacent cylinder surface exits in an unintended direction, and consequently lowers the utilization efficiency of the laser light transmitted through the SAC.

The present invention has been made to solve the problems described above, and an object of the present invention is therefore to provide a beam shaping device and a laser oscillator with which handling and manufacturing thereof are made easy and a drop in the utilization efficiency of laser light can be prevented.

Solution to Problem

According to one embodiment of the present invention, there is provided a beam shaping device, which is configured to collimate a plurality of beams of laser light, each of which is emitted from one of emission end surfaces of a plurality of light emitting portions aligned in a first direction in a light emission device toward an optical axis direction orthogonal to the first direction, the beam shaping device including: a first collimator lens configured to collimate at least one of the plurality of beams of laser light that diverges in the first direction; and a second collimator lens configured to collimate at least one of the plurality of beams of laser light that diverges in a second direction, which is a direction orthogonal to the optical axis direction and the first direction both, wherein the first collimator lens is placed between the light emission device and the second collimator lens, wherein the first collimator lens has formed therein a first incident surface, which the plurality of beams of laser light enter, and a first exit surface, from which the plurality of beams of laser light exit, wherein the first incident surface includes a plurality of incident-side lens surfaces aligned in the first direction, wherein the plurality of incident-side lens surfaces each have, in section orthogonal to the second direction, a shape convexed toward outside of the first collimator lens and, in section orthogonal to the first direction, a shape concaved toward inside of the first collimator lens, and wherein a shape of the first incident surface and a shape of the first exit surface in section orthogonal to the first direction include concentric arcs having a point on the emission end surface of one of the plurality of light emitting portions as a center.

Advantageous Effects of Invention

According to the beam shaping device and laser oscillator of the present invention, the first collimator lens and the second collimator lens can be handled and manufactured with ease. The beam shaping device and the laser oscillator are also capable of preventing an unnecessary aberration when the pitch between light emitting portions is narrow, and can thus keep the utilization efficiency of laser light from dropping.

DESCRIPTION OF EMBODIMENTS

Now, embodiments of the present invention are described with reference to the drawings.

First Embodiment

Figure 1:
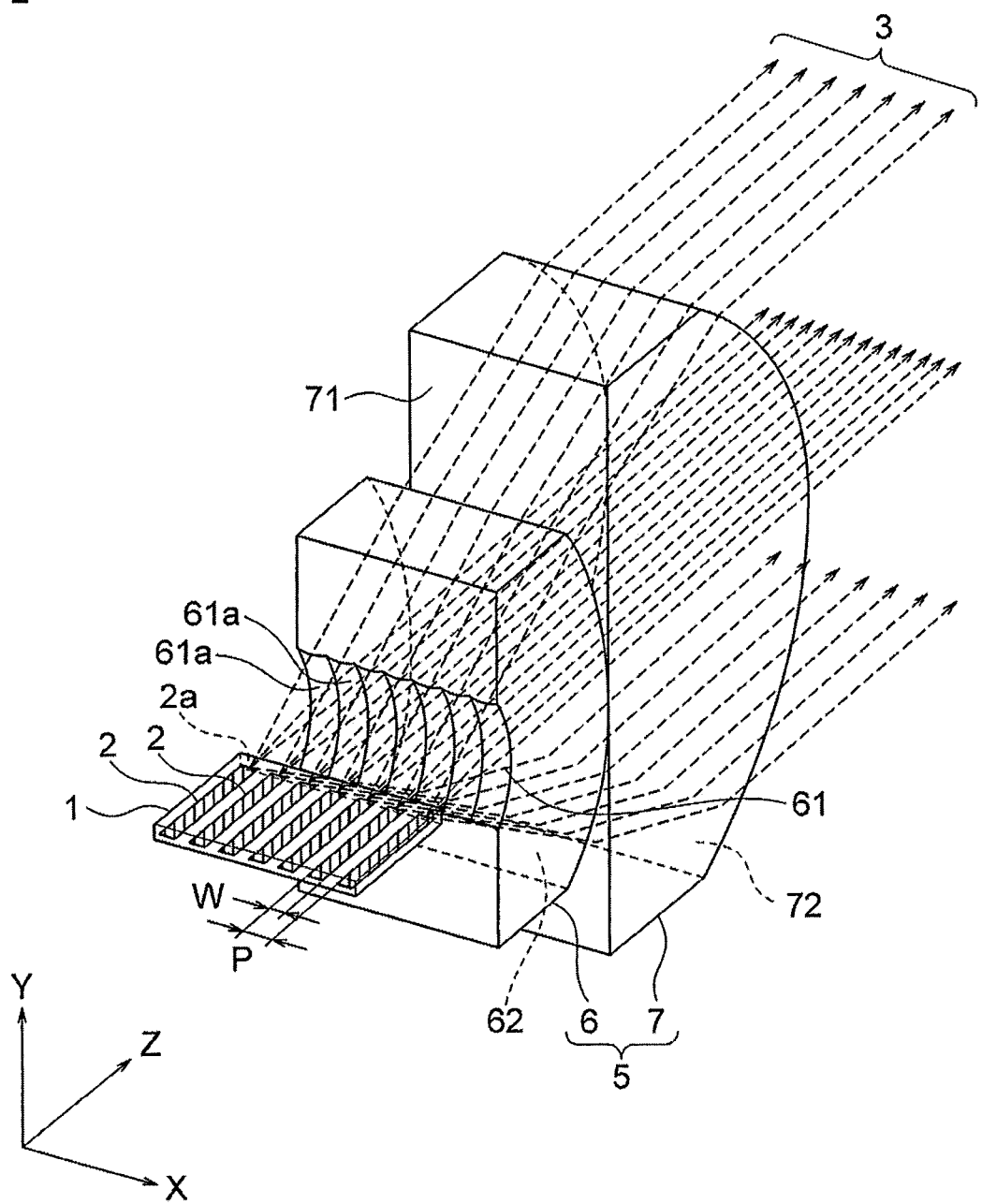
FIG. 1 is a perspective view for illustrating a beam shaping device according to a first embodiment of the present invention, and an LD bar in the first embodiment.

FIG. 1 is a perspective view for illustrating a beam shaping device according to a first embodiment of the present invention, and an LD bar in the first embodiment. In FIG. 1, an LD bar 1, which is a light emission device, is a semiconductor laser provided with a plurality of light emitting layers 2 as a light emitting portion. Each of the light emitting layers 2 emits laser light 3. The LD bar 1 is manufactured by performing a semiconductor process, typically lithography, on an InGaAs substrate or an AlGaAs substrate. Illustrations of a heat sink for cooling the LD bar 1, a sub-mount interposed between the LD bar 1 and the heat sink, and an electrode and gold wire for establishing electrical connection to the LD bar 1 are omitted from FIG. 1.

The light emitting layers 2 are laid side by side at intervals in a first direction, which is an X-direction (one-dimensional direction) in FIG. 1. In this example, approximately ten to fifty light emitting layers 2 are laid side by side at equal pitches P. The number of the light emitting layers 2 in FIG. 1 is seven for simplification. Optical axes of the light emitting layers 2 are each orthogonal to the X-direction in FIG. 1 and are parallel to one another. A direction running along the optical axes of the light emitting layers 2 matches a Z-direction in FIG. 1. Beams of laser light 3 are emitted from emission end surfaces 2a of the light emitting layers 2 to the direction running along the optical axes of the light emitting layers 2, namely, the Z-direction in FIG. 1 (hereinafter referred to as "optical axis direction Z"). The emission end surfaces 2a of the light emitting layers 2 are aligned in a straight line running along the X-direction in FIG. 1.

A width W of each light emitting layer 2 is greater than the thickness of the light emitting layer 2. In this example, the width W of each light emitting layer 2 is from approximately 50 μm to approximately 200 μm, and the thickness of each light emitting layer 2 is approximately 1 μm. A value W/P obtained by dividing the width W of each light emitting layer 2 by the pitch P between the light emitting layers 2 is called a fill factor F.

The light emitting layers 2 are arranged so that the width direction of the light emitting layers 2 matches the X-direction in FIG. 1, in which the light emitting layers 2 are laid side by side, and so that the thickness direction of the light emitting layers 2 matches a Y-direction, which is a second direction orthogonal to both the X-direction and the optical axis direction Z in FIG. 1. In beams of laser light 3 emitted from the emission end surfaces 2a of the light emitting layers 2, the divergence angle of the laser light 3 in the width direction of the light emitting layers 2 is smaller than the divergence angle of the laser light 3 in the thickness direction of the light emitting layers 2. Of the width direction and thickness direction of the light emitting layer 2, the direction in which the divergence angle of the laser light 3 is small is a slow axis direction, and the direction in which the divergence angle of the laser light 3 is large is a fast axis direction. The laser light 3 in this example has a divergence angle of from 7 deg to 11 deg in the slow axis direction of the light emitting layers 2, and a divergence angle of from 45 deg to 60 deg in the fast axis direction of the light emitting layers 2. Accordingly, the slow axis direction of the light emitting layers 2 matches the X-direction in FIG. 1 and the fast axis direction of the light emitting layers 2 matches the Y-direction in FIG. 1.

A plurality of beams of laser light 3 emitted from the emission end surfaces 2a of the light emitting layers 2 of the LD bar 1 are collimated, that is, parallelized, by a beam shaping device 5. The beam shaping device 5 includes an SAC 6, which is a first collimator lens configured to collimate the laser light 3 that diverges in the X-direction in FIG. 1, namely, the slow axis direction (hereinafter referred to as "slow axis direction X"), and an FAC 7, which is a second collimator lens configured to collimate the laser light 3 that diverges in the Y-direction in FIG. 1, namely, the fast axis direction (hereinafter referred to as "fast axis direction Y"). The SAC 6 is placed between the LD bar 1 and the FAC 7 in the optical axis direction Z.

Figure 2:
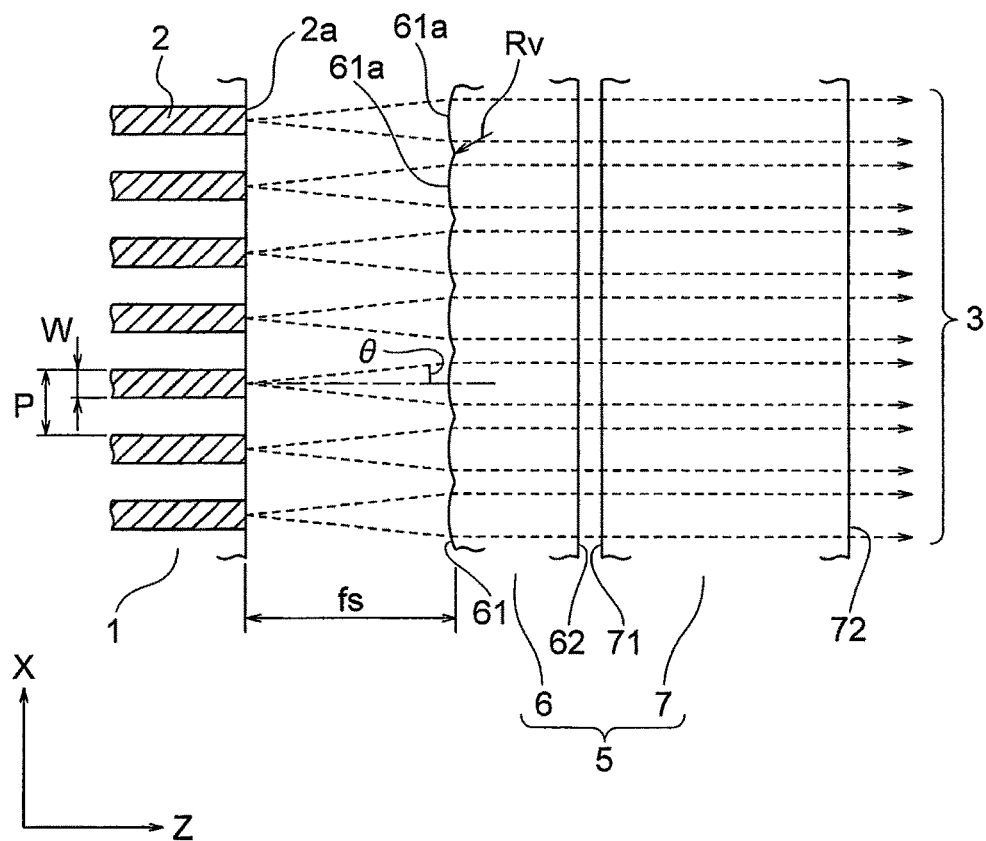
FIG. 2 is a sectional view for illustrating the LD bar and the beam shaping device in an X-Z plane, which is orthogonal to a fast axis direction Y of FIG. 1.
Figure 3:
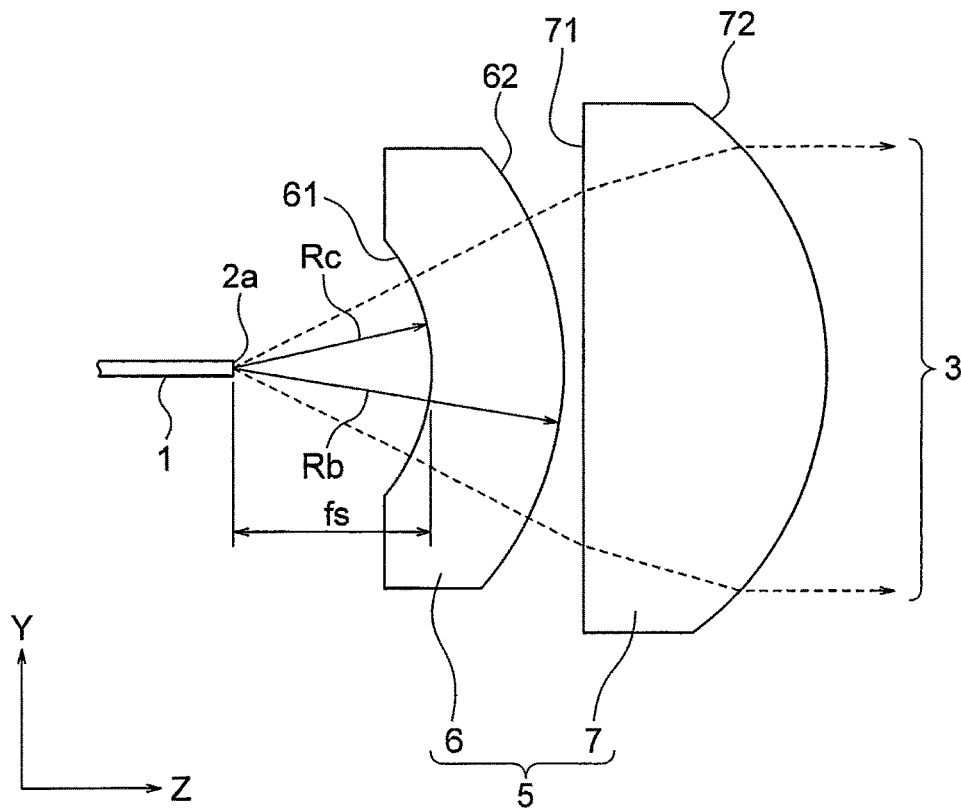
FIG. 3 is a sectional view for illustrating the LD bar and the beam shaping device in a Y-Z plane, which is orthogonal to a slow axis direction X of FIG. 1.

FIG. 2 is a sectional view for illustrating the LD bar 1 and the beam shaping device 5 in an X-Z plane, which is orthogonal to the fast axis direction Y in FIG. 1. FIG. 3 is a sectional view for illustrating the LD bar 1 and the beam shaping device 5 in a Y-Z plane, which is orthogonal to the slow axis direction X in FIG. 1. A first incident surface 61, which beams of laser light 3 enter, and a first exit surface 62, from which the beams of laser light 3 having entered the SAC 6 exit, are formed in the SAC 6. The SAC 6 is arranged so that the first incident surface 61 faces the LD bar 1, and so that the first exit surface 62 faces the side opposite from the LD bar 1, namely, the FAC 7.

The first incident surface 61 is a micro lens array in which a plurality of incident-side lens surfaces 61a are aligned in the slow axis direction X. Each incident-side lens surface 61a is positioned so as to correspond to one of the light emitting layers 2 in the slow axis direction X.

The incident-side lens surfaces 61a each have, in section taken along the X-Z plane (hereinafter referred to as "X-Z section"), which is orthogonal to the fast axis direction Y, a shape convexed toward the outside of the SAC 6 as illustrated in FIG. 2 and, in section taken along the Y-Z plane (hereinafter referred to as "Y-Z section"), which is orthogonal to the slow axis direction X, a shape concaved toward the inside of the SAC 6 as illustrated in FIG. 3.

The first exit surface 62, on the other hand, is shaped so as to be linear in X-Z section as illustrated in FIG. 2 and so as to be convexed toward the outside of the SAC 6 in Y-Z section as illustrated in FIG. 3. In other words, the first exit surface 62 is a single lens surface convexed toward the outside of the SAC 6 and shaped like a cylinder with a generating line running along the slow axis direction X.

In X-Z section, the distance from the emission end surfaces 2a of the light emitting layers 2 to the first incident surface 61 is equal to a focal distance fs of each incident-side lens surface 61a as illustrated in FIG. 2. In other words, the emission end surface 2a of each light emitting layer 2 is positioned at the focal position of one of the incident-side lens surfaces 61a, and the laser light 3 emitted from the emission end surface 2a is collimated in the slow axis direction X by the incident-side lens surface 61a of the first incident surface 61. Each beam of laser light 3 collimated by the first incident surface 61 passes through the first exit surface 62 as it is, without being refracted in X-Z section.

The shape of the first incident surface 61 and the shape of the first exit surface 62 in Y-Z section are concentric arcs having a point on the emission end surface 2a of one of the light emitting layers 2 as the center as illustrated in FIG. 3. This causes the laser light 3 emitted from the emission end surface 2a to be transmitted through the SAC 6 as it is without being refracted in Y-Z section. Accordingly, no aberration occurs in each beam of laser light 3 transmitted through the SAC 6 in Y-Z section. A curvature radius Rc of the first incident surface 61 in Y-Z section is equal to the focal distance fs of each incident-side lens surface 61a.

A curvature radius Rv of each incident-side lens surface 61a in X-Z section increases as the focal distance fs of the incident-side lens surface 61a becomes longer. The manufacturing of the SAC 6 is accordingly easier when the focal di-stance fs of each incident-side lens surface 61a is longer. However, the lengthening of the focal distance fs causes beams of laser light 3 from two light emitting layers 2 adjacent to each other in the slow axis direction X to overlap, which lowers the utilization efficiency of the laser light 3.

For that reason, the focal distance fs in this example is determined so that the laser light 3 emitted from one light emitting layer 2 enters only one incident-side lens surface 61a opposed to the light emitting layer 2, and not an adjacent incident-side lens surface 61a. In other words, it can be said from FIG. 2 that the focal distance fs of each incident-side lens surface 61a is a value that satisfies a relationship expressed with the use of a divergence angle θ of the laser light 3 in the slow axis direction X, the pitch P between the light emitting layers 2, and the width W of each light emitting layer 2: fs<(P−W)/2θ. When the divergence angle θ is 4 deg, the pitch P between the light emitting layers 2 is 200 μm, and the width W of each light emitting layer 2 is 80 μm, for example, the upper limit of the focal distance fs is approximately 850 μm. The curvature radius Rc of the first incident surface 61 in Y-Z section illustrated in FIG. 3 is 850 μm in this example. When the refractive index of the SAC 6 is 1.5, the curvature radius Rv of each incident-side lens surface 61a in X-Z section illustrated in FIG. 2 is 425 μm.

The first exit surface 62 in Y-Z section illustrated in FIG. 3 is shaped like an arc having a point on the emission end surface 2a of one of the light emitting layers 2 as the center. The laser light 3 passing through the first exit surface 62 is therefore not refracted in Y-Z section. This means that the thickness of the SAC 6 can be selected freely and, for example, the thickness of the SAC 6 can be set to a thickness of several millimeters in order to make the SAC 6 easy to handle and manufacture. When the SAC 6 is 3.15 mm in thickness, a curvature radius Rb of the first exit surface 62 in Y-Z section is 4.0 mm.

The FAC 7 is a cylindrical lens having a generating line along the slow axis direction X. A second incident surface 71, which beams of laser light 3 transmitted through the SAC 6 enter, and a second exit surface 72, from which the beams of laser light 3 having entered the FAC 7 exit, are formed in the FAC 7. The FAC 7 is arranged so that the second incident surface 71 faces the SAC 6 and the second exit surface 72 faces the side opposite from the SAC 6.

The second incident surface 71 is a flat surface orthogonal to the optical axis direction Z. The second incident surface 71 may be shaped like a cylinder having a generating line along the slow axis direction X and having a very large curvature radius.

The second incident surface 71 and the second exit surface 72 are each shaped like a straight line orthogonal to the optical axis direction Z in X-Z section illustrated in FIG. 2. Beams of laser light 3 transmitted through the SAC 6 are accordingly transmitted through the FAC 7 without being refracted in X-Z section.

The second incident surface 71 in Y-Z section illustrated in FIG. 3 is shaped like a straight line orthogonal to the optical axis direction Z, or a substantially straight line large in curvature radius. The second exit surface 72 in Y-Z section has a shape convexed toward the outside of the FAC 7. The shape of the second incident surface 71 and the shape of the second exit surface 72 in Y-Z section are each symmetrical with respect to the optical axes of the light emitting layers 2. Beams of laser light transmitted through the SAC 6 are thus collimated during transmission through the FAC 7 by the second incident surface 71 and the second exit surface 72 each in the fast axis direction Y. In order to collimate the beams of laser light 3 with precision in the fast axis direction Y, in which the divergence angle is large, in particular, the second exit surface 72 is given a non-arc shape instead of a simple arc shape in Y-Z section.

Beams of laser light 3 emitted from the emission end surfaces 2a are accordingly transmitted through the SAC 6 in Y-Z section illustrated in FIG. 3 as if the SAC 6 does not exist, to be collimated by the FAC 7. The FAC 7 can therefore be designed and arranged without regard to whether the SAC 6 is present or absent. A size in which the FAC 7 does not interfere with the SAC 6 and is easy to handle and manufacture can accordingly be selected for the FAC 7.

The SAC 6 and the FAC 7 are each made of glass. The SAC 6 and the FAC 7 are manufactured by, for example, press molding of glass. The SAC 6 and the FAC 7 may also be made of resin, depending on, for example, the power of the laser light 3 of the LD bar 1 or the wavelength of the laser light 3. For example, resin lenses manufactured by injection molding of polycarbonate may be used as the SAC 6 and the FAC 7.

When the SAC 6 and the FAC 7 are manufactured by press molding, the SAC 6 and the FAC 7 are formed by transferring molds to glass. The shapes of mold surfaces in the molds are accordingly inverted shapes of the SAC 6 and the FAC 7.

Figure 4:
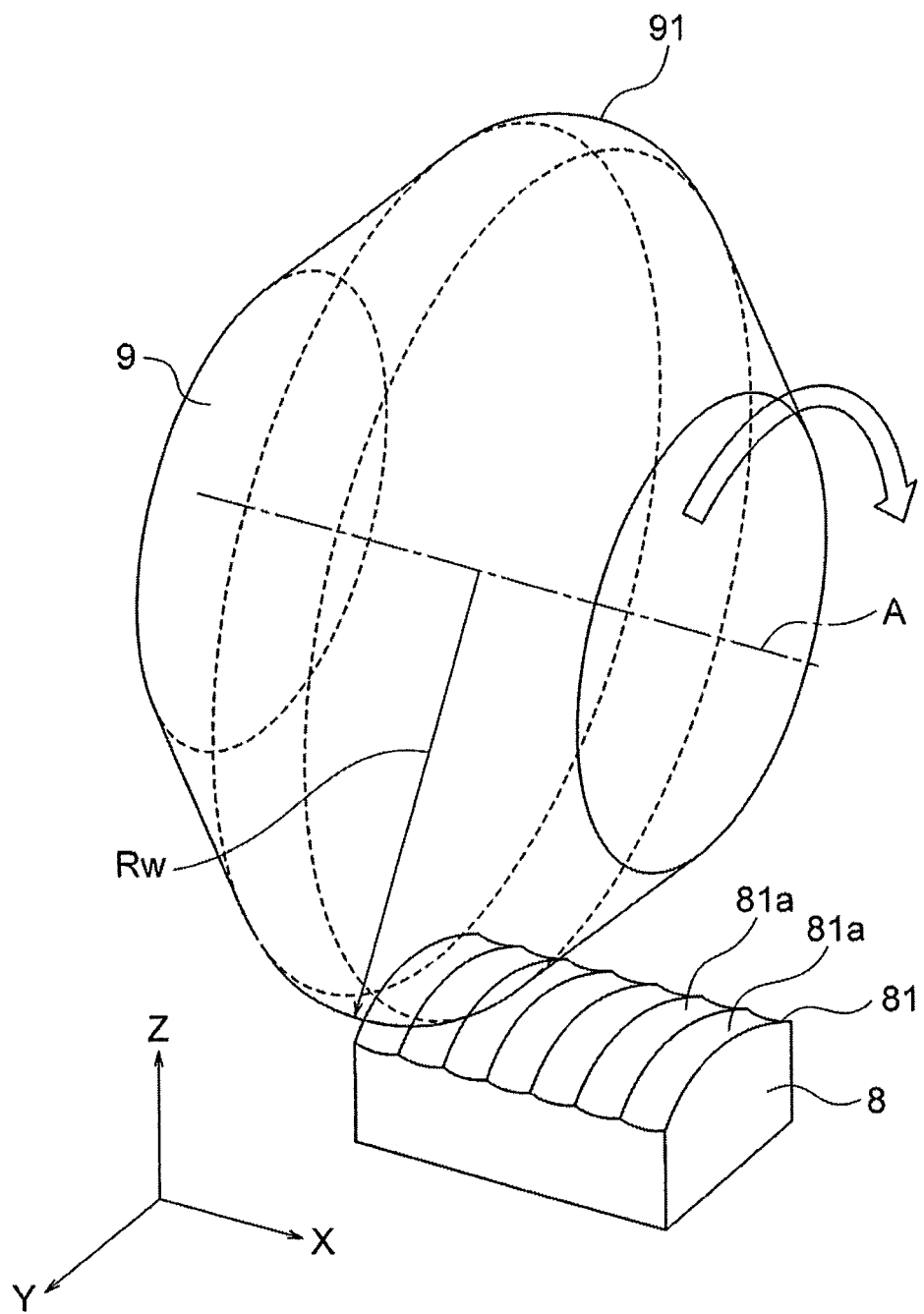
FIG. 4 is a perspective view for illustrating a portion in which a mold surface for forming a first incident surface is formed, out of an SAC mold used for the press molding of an SAC of FIG. 1.

FIG. 4 is a perspective view for illustrating a portion in which a mold surface for forming the first incident surface 61 is formed, out of an SAC mold used for the press molding of the SAC 6 of FIG. 1. A state in which the mold surface in the SAC mold is being machined is illustrated in FIG. 4. An SAC mold 8 includes an incident-side mold surface 81 for molding the first incident surface 61, and the incident-side mold surface 81 has an inverted shape of the first incident surface 61. The incident-side mold surface 81 accordingly includes a plurality of unit molding surfaces 81a aligned in the slow axis direction X. The unit molding surfaces 81a each have, in Y-Z section, a shape convexed toward the outside of the SAC mold 8 and, in X-Z section, a shape concaved toward the inside of the SAC mold 8.

The unit molding surfaces 81a of the SAC mold 8 are machined by polishing with a grinding stone 9. The grinding stone 9 has a disc-like shape. The grinding stone 9 is rotatable about an axis line A of the rotation axis of the grinding stone 9. Each unit molding surface 81a is machined by arranging the axis line A of the grinding stone 9 along the slow axis direction X as illustrated in FIG. 4, and rotating the grinding stone 9 about the axis line A while bringing an outer circumferential portion (i.e., edge portion) 91 of the grinding stone 9 into contact with the unit molding surface 81a. The shape of each unit molding surface 81a is convexed toward the outside of the SAC mold 8 in Y-Z section, which is orthogonal to the axis line A of the grinding stone 9, and is accordingly not restricted by the length of a radius Rw of the grinding stone 9 when the unit molding surface 81a is machined with the grinding stone 9. Meanwhile, an exit-side mold surface, which is a portion of the SAC mold 8 that is used to mold the first exit surface 62, has a shape concaved toward the inside of the SAC mold 8 in Y-Z section. However, there is no problem in machining the exit-side mold surface of the SAC mold 8 with the grinding stone 9 as well because the curvature radius Rb of the first exit surface 62 is sufficiently greater than the curvature radius Rv of the first incident-side lens surface 61a. In short, the manufacturing of the SAC 6 is made easy by using a lens array as the first incident surface 61, out of the first incident surface 61 and first exit surface 62 of the SAC 6.

In the thus configured beam shaping device 5, the SAC 6 is placed between the LD bar 1 and the FAC 7, a lens array in which the plurality of incident-side lens surfaces 61a are aligned in the slow axis direction X serves as the first incident surface 61 of the SAC 6, and the first incident surface 61 and first exit surface 62 of the SAC 6 are shaped like concentric arcs having a point on the emission end surface 2a of one of the light emitting layers 2 as the center in Y-Z section, which is orthogonal to the slow axis direction X. The beam shaping device 5 is accordingly capable of preventing surfaces of the SAC 6 and the FAC 7 from having too short a curvature radius, while preventing an overlap between beams of laser light 3 emitted from the LD bar 1 even when the pitch P between the light emitting layers 2 of the LD bar 1 is narrow. This makes the SAC 6 and the FAC 7 easy to handle and manufacture while preventing an unnecessary aberration. In addition, with the SAC 6 and the FAC 7 being manufactured easily, power enhancement of the laser light 3 of the LD bar 1 can be advanced further while a drop in the utilization efficiency of the laser light 3 is prevented despite the narrowing of the pitch P between the light emitting layers 2 of the LD bar 1.

Second Embodiment

Figure 5:
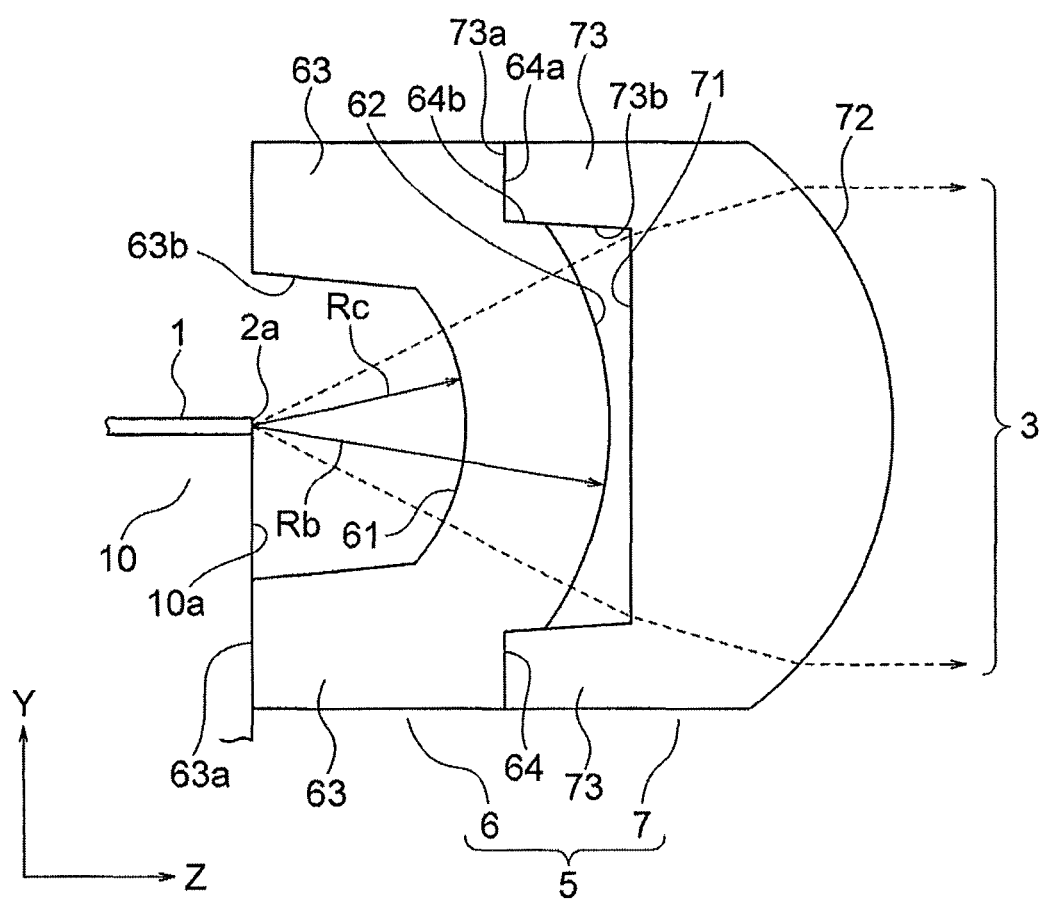
FIG. 5 is a sectional view for illustrating a beam shaping device according to a second embodiment of the present invention, and an LD bar in the second embodiment.

FIG. 5 is a sectional view for illustrating a beam shaping device according to a second embodiment of the present invention, and an LD bar in the second embodiment. The LD bar 1 is fixed to a top surface of a heat sink 10. The heat sink 10 is, for example, a block made of copper. An end surface 10a of the heat sink 10 is a flat surface orthogonal to the optical axis direction Z of the light emitting layers 2. The LD bar 1 in this example partially protrudes from the end surface 10a of the heat sink 10 in the optical axis direction Z, with the result that the emission end surfaces 2a of the light emitting layers 2 are positioned closer to the SAC 6 than the end surface 10a of the heat sink 10 is. The heat sink 10 is provided with a pipe (not shown) in which cooling water flows.

The first incident surface 61 and first exit surface 62 of the SAC 6 are shaped in Y-Z section like concentric arcs having a point on the emission end surface 2a of one of the light emitting layers 2 as the center. The SAC 6 is accordingly required to be positioned accurately in the optical axis direction Z in relation to the emission end surface 2a. The focal position of the FAC 7 is required to match the position of the emission end surface 2a as well, which means that the FAC 7 is also required to be positioned accurately in the optical axis direction Z in relation to the emission end surface 2a. In addition, in order to ensure that the center of the arcs of the first incident surface 61 and first exit surface 62 of the SAC 6 and the focal position of the FAC 7 match the position of the emission end surface 2a, the FAC 7 is required to be positioned accurately not only in the optical axis direction Z but also in the fast axis direction Y in relation to the SAC 6 so that center misalignment between the SAC 6 and the FAC 7 in the fast axis direction Y is reduced.

In the second embodiment, a pair of seats 63 serving as attachment seats protrudes toward the LD bar 1 side from two end portions of the SAC 6, which are end portions in the fast axis direction Y. End surfaces 63a, which are flat surfaces orthogonal to the optical axes of the light emitting layers 2, are formed in protruding end portions of the seats 63. The end surface 63a of one seat 63 out of the pair of seats 63 is fixed to the end surface 10a of the heat sink 10 with, for example, an adhesive. That is, by fixing the end surface 63a of one of the seats 63 to the end surface 10a of the heat sink 10, the SAC 6 is positioned in relation to the emission end surface 2a of each light emitting layer 2. The end surface 10a of the heat sink 10 accordingly serves as a reference surface for positioning the SAC 6 in the optical axis direction Z in relation to the emission end surface 2a. The adhesive used to fix the seat 63 to the end surface 10a of the heat sink 10 is, for example, an acrylic-based UV-curable resin adhesive.

The pair of seats 63 and the SAC 6 are formed unitarily, with no boundaries between the SAC 6 and the seats 63, by performing press molding with the use of an SAC mold and the same material as that of the SAC 6. The amount of protrusion of the seats 63 from the SAC 6 depends on what SAC mold is used in press molding. The dimension precision of a mold is generally high, and an error in the amount of protrusion of the seats 63 from the SAC 6 can accordingly be made very small. The SAC 6 can consequently be positioned with high precision in the optical axis direction Z in relation to the emission end surface 2a.

The positions and shapes of the pair of seats 63 in Y-Z section are symmetrical with respect to the optical axes of the light emitting layers 2. The pair of seats 63 is situated on each side of the first incident surface 61 in the fast axis direction Y. A pair of seat tapered surfaces 63b opposed to each other in the fast axis direction Y is formed in the pair of seats 63. The first incident surface 61 is exposed to a space sandwiched between the pair of seat tapered surfaces 63b. The distance between the pair of seat tapered surfaces 63b in the fast axis direction Y increases continuously toward the LD bar 1. Each seat tapered surface 63b in this example has a gradient of from 2° to 8° with respect to the optical axes of the light emitting layers 2 in Y-Z section. This facilitates the release of the first incident surface 61 of the SAC 6 from the SAC mold when the SAC 6 is taken out of the SAC mold in press molding.

A pair of seats 73 protrudes toward the SAC 6 from two end portions of the FAC 7 in the fast axis direction Y. The positions and shapes of the pair of seats 73 in Y-Z section are symmetrical with respect to the optical axes of the light emitting layers 2. The pair of seats 73 is situated on each side of the second incident surface 71 in the fast axis direction Y. A pair of recessed portions 64, in which the seats 73 forming a pair are individually fit, is formed in the two end portions of the SAC 6, which are end portions in the fast axis direction Y.

End surfaces 73a, which are flat surfaces orthogonal to the optical axes of the light emitting layers 2, are formed in protruding end portions of the seats 73. Recessed portion reception surfaces 64a are formed in the recessed portions 64 to receive the end surfaces 73a of the seats 73 in the optical axis direction Z. The recessed portion reception surfaces 64a are flat surfaces orthogonal to the optical axes of the light emitting layers 2.

The end surfaces 73a of the seats 73 are fixed to the recessed portion reception surfaces 64a of the recessed portions 64 with, for example, an adhesive. That is, by fixing the end surfaces 73a of the seats 73 to the recessed portion reception surfaces 64a of the SAC 6, the FAC 7 is positioned in the optical axis direction Z in relation to the recessed portion reception surfaces 64a of the SAC 6. The recessed portion reception surfaces 64aa of the SAC 6 accordingly serve as reference surfaces for positioning the FAC 7 in the optical axis direction Z in relation to the SAC 6. The adhesive used to fix the seats 73 to the recessed portion reception surfaces 64a of the recessed portions 64 is, for example, an acrylic-based UV-curable resin adhesive.

The pair of seats 73 and the FAC 7 are formed unitarily, with no boundaries between the FAC 7 and the seats 73, by performing press molding with the use of an FAC mold and the same material as that of the FAC 7. The amount of protrusion of the seats 73 from the FAC 7 depends on what FAC mold is used in press molding. The dimension precision of a mold is generally high, and an error in the amount of protrusion of the seats 73 from the FAC 7 can accordingly be made very small. The FAC 7 can consequently be positioned with high precision in the optical axis direction Z in relation to the SAC 6.

A pair of seat tapered surfaces 73b opposed to each other in the fast axis direction Y is formed in the pair of seats 73. The second incident surface 71 is exposed to a space sandwiched between the pair of seat tapered surfaces 73b. The distance between the pair of seat tapered surfaces 73b in the fast axis direction Y increases continuously toward the SAC 6. Each seat tapered surface 73b in this example has a gradient of from 2° to 8° with respect to the optical axes of the light emitting layers 2 in Y-Z section. This facilitates the release of the second incident surface 71 of the FAC 7 from the FAC mold when the FAC 7 is taken out of the FAC mold in press molding.

Recessed portion tapered surfaces 64b contoured along the seat tapered surfaces 73b of the seats 73 are formed in the recessed portions 64. The recessed portion tapered surfaces 64b are in contact with the seat tapered surfaces 73b with no space between the recessed portion tapered surfaces 64b and the seat tapered surfaces 73b. The FAC 7 is thus positioned in the fast axis direction Y in relation to the SAC 6. Center misalignment between the SAC 6 and the FAC 7 in the fast axis direction Y is prevented by receiving the seat tapered surfaces 73b with the recessed portion tapered surfaces 64b.

Figure 6:
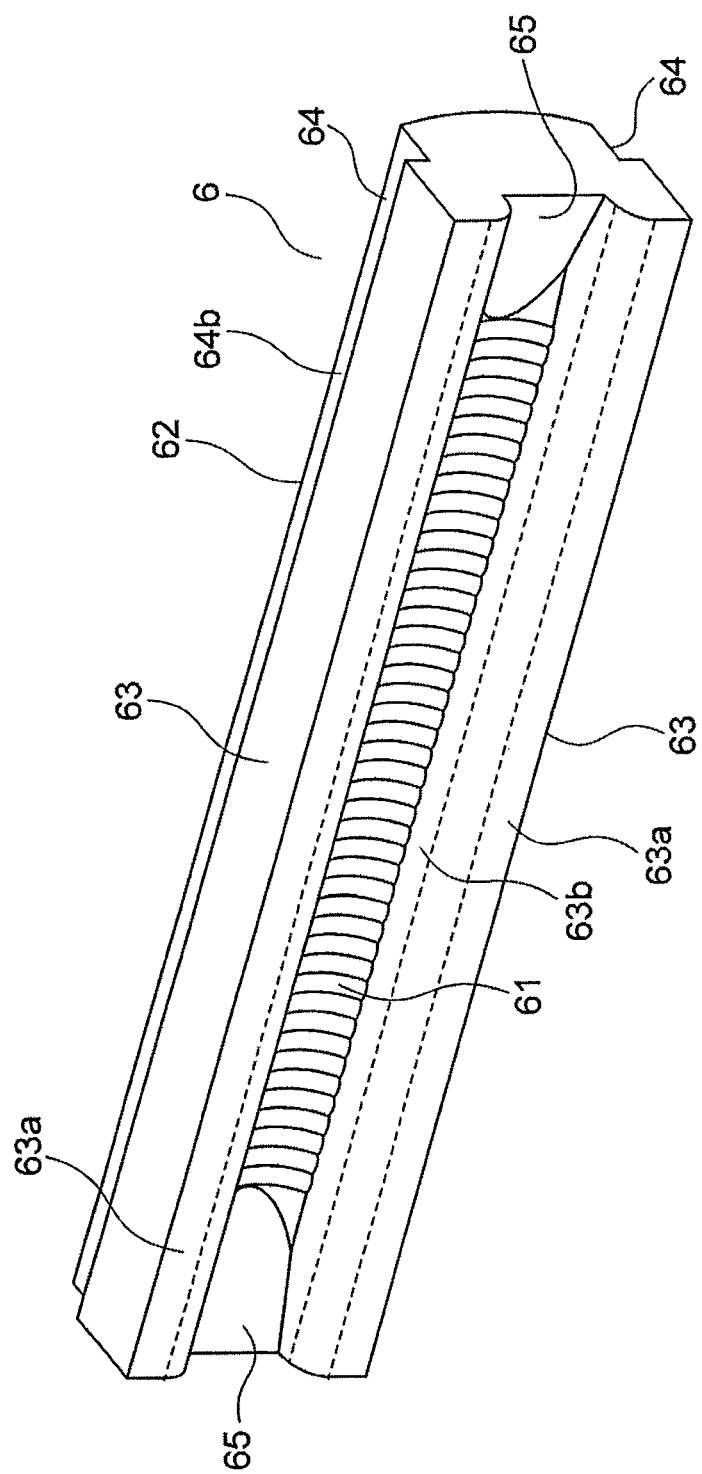
FIG. 6 is a perspective view for illustrating an SAC of FIG. 5.

FIG. 6 is a perspective view for illustrating the SAC 6 of FIG. 5. A pair of incident-side tapered surfaces 65 is formed in the SAC 6. The pair of incident-side tapered surfaces 65 is situated on each side of the first incident surface 61 in the slow axis direction X, and is extended from the first incident surface 61. The positions and shapes of the pair of incident-side tapered surfaces 65 in X-Z section are symmetrical with respect to an axis running through the center of the first incident surface 61 and parallel to the optical axis direction X. In X-Z section, the incident-side tapered surfaces 65 are slanted with respect to the optical axes of the light emitting layers 2, and the distance between the pair of incident-side tapered surfaces 65 increases continuously toward the LD bar 1 side as the distance from the first incident surface 61 becomes longer. The pair of incident-side tapered surfaces 65 is situated between the pair of seats 63 in the fast axis direction Y. The rest of the configuration is the same as in the first embodiment.

In the thus configured beam shaping device 5, the pair of seats 63 protrudes from the SAC 6, and the end surface 63a of one of the seats 63 is fixed to the end surface 10a of the heat sink 10 to which the LD bar 1 is fixed. The SAC 6 can accordingly be positioned with ease and more accuracy in the optical axis direction Z in relation to the emission end surfaces 2a of the LD bar 1. In this manner, power enhancement of the laser light 3 of the LD bar 1 can be advanced further while preventing a drop in the utilization efficiency of the laser light 3 at an even higher success rate.

The FAC 7, too, can be positioned with ease and more accuracy in the fast axis direction Y and the optical axis direction Z in relation to the SAC 6 because the pair of seats 73 protrudes from the FAC 7 and the pair of recessed portions 64, in which the seats 73 forming a pair are individually fit, is formed in the SAC 6. In this manner, power enhancement of the laser light 3 of the LD bar 1 can be advanced further while preventing a drop in the utilization efficiency of the laser light 3 at an even higher success rate.

The pair of seat tapered surfaces 73b opposed to each other in the fast axis direction Y are formed in the pair of seats 73 protruding from the FAC 7, and the recessed portion tapered surfaces 64b contoured along the seat tapered surfaces 73b of the seats 73 are formed in the pair of recessed portions 64, which is formed in the SAC 6. This makes it easy to fit the pair of seats 73 protruding from the FAC 7 in the pair of recessed portions 64 of the SAC 6, thereby facilitating the positioning of the FAC 7 in relation to the SAC 6 even more.

The precision of the shapes of the first incident surface 61 and the first exit surface 62 can also be improved because the pair of seats 63 is positioned and shaped symmetrically with respect to the optical axes of the light emitting layers 2 in Y-Z section. The precision of the shapes of the second incident surface 71 and the second exit surface 72 can be improved as well because the pair of seats 73 is positioned and shaped symmetrically with respect to the optical axes of the light emitting layers 2 in Y-Z section.

The pair of incident-side tapered surfaces 65 is formed in the SAC 6 and is situated on each side of the first incident surface 61 in the slow axis direction X. This prevents the first incident surface 61, which is a lens array in which the plurality of incident-side lens surfaces 61a are aligned, from cracking when the SAC 6 is manufactured by press molding with the use of a mold, by utilizing the difference in linear expansion coefficient between the mold and glass, which is a raw material of the SAC 6, to slide the glass along the pair of incident-side tapered surfaces 65 and to cause the glass to come off the mold on its own before a crack is formed in the first incident surface 61 in a cooling process for cooling the glass and the mold.

The pair of seats 63 and the SAC 6 can be formed unitarily, with no boundaries between the pair of seats 63 and the SAC 6, by manufacturing the pair of seats 63 and the SAC 6 simultaneously by press molding with the use of a mold. In this manner, the number of parts and man-hours of the beam shaping device 5 can be reduced while preventing a drop in the utilization efficiency of the laser light 3 by using the pair of seats 63 in the positioning of the SAC 6. The cost can consequently be reduced.

The pair of seats 73 and the FAC 7 can be manufactured simultaneously as well by press molding with the use of a mold, because the pair of seats 73 and the FAC 7 are unitarily formed with no boundaries between the pair of seats 73 and the FAC 7. In this manner, the number of parts and man-hours of the beam shaping device 5 can be reduced while preventing a drop in the utilization efficiency of the laser light 3 by using the pair of seats 73 in the positioning of the FAC 7. The cost can consequently be reduced.

Third Embodiment

Figure 7:
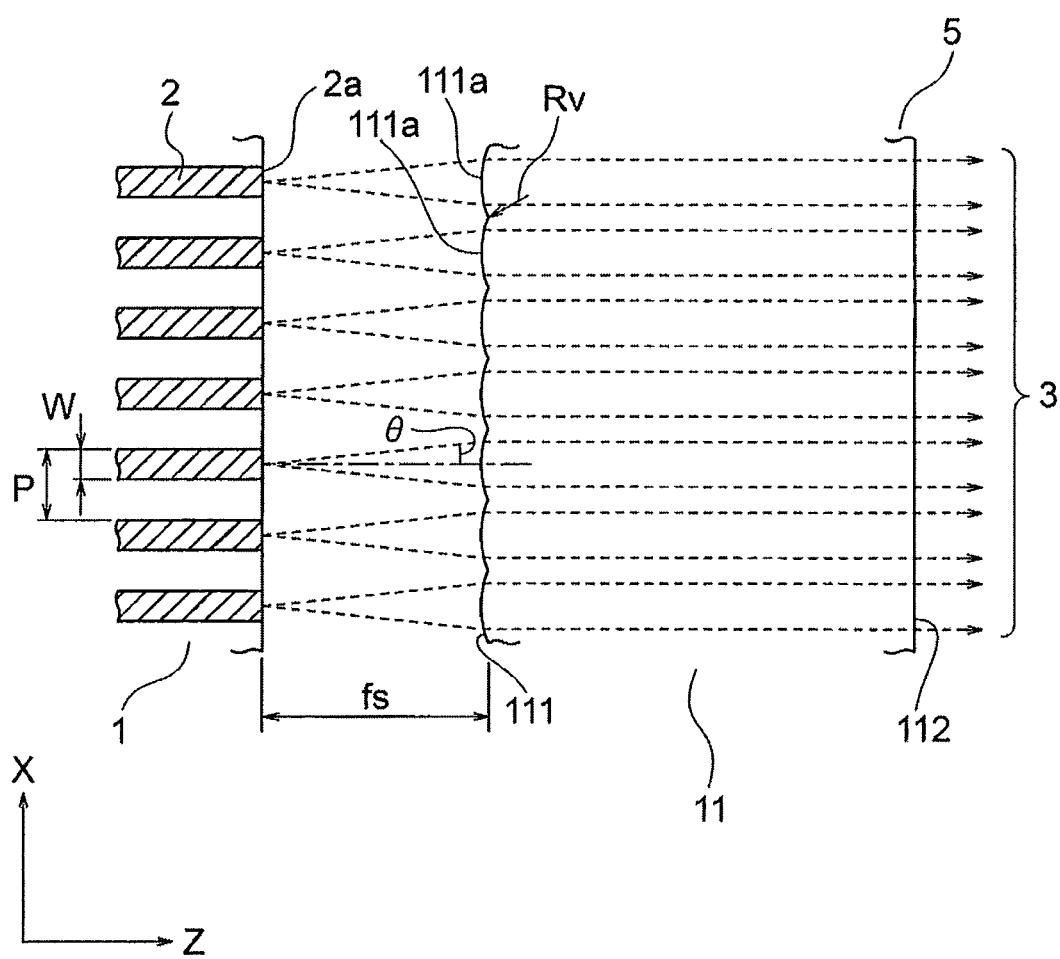
FIG. 7 is a sectional view for illustrating how a beam shaping device according to a third embodiment of the present invention and an LD bar in the third embodiment look when cut along the X-Z plane, which is orthogonal to the fast axis direction Y of light emitting layers.
Figure 8:
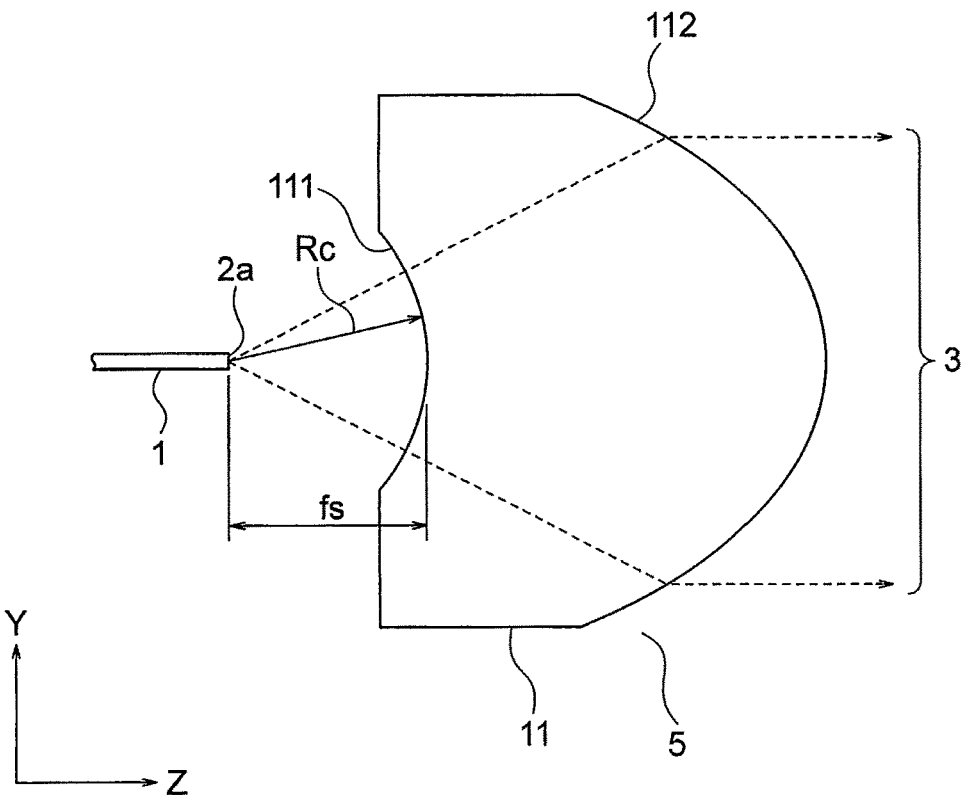
FIG. 8 is a sectional view for illustrating how the beam shaping device and LD bar of FIG. 7 look when cut along the Y-Z plane, which is orthogonal to the slow axis direction X of light emitting layers.

FIG. 7 is a sectional view for illustrating how a beam shaping device according to a third embodiment of the present invention and an LD bar in the third embodiment look when cut along the X-Z plane, which is orthogonal to the fast axis direction Y of light emitting layers. FIG. 8 is a sectional view for illustrating how the beam shaping device and LD bar of FIG. 7 look when cut along the Y-Z plane, which is orthogonal to the slow axis direction X of light emitting layers. The beam shaping device 5 includes, as a first collimator lens, an SAC/FAC 11, which is a unitary lens integrating the function of collimating the laser light 3 in the slow axis direction X and the function of collimating the laser light 3 in the fast axis direction Y. The beam shaping device 5 according to the third embodiment therefore includes only the first collimator lens and no second collimator lens.

A first incident surface 111, which beams of laser light 3 enter, and a first exit surface 112, from which the beams of laser light 3 having entered the SAC/FAC 11 exit, are formed in the SAC/FAC 11. The SAC/FAC 11 is arranged so that the first incident surface 111 faces the LD bar 1, and so that the first exit surface 112 faces the side opposite from the LD bar 1. The SAC/FAC 11 is formed by press molding with the use of a mold.

The first incident surface 111 is a surface having the same function as that of the SAC 6 in the first embodiment. The first incident surface 111 is configured in the same way as the first incident surface 61 of the SAC 6 in the first embodiment. Specifically, the first incident surface 111 is a micro lens array in which a plurality of incident-side lens surfaces 111a are aligned in the slow-axis direction X. Each incident-side lens surface 111a is positioned so as to correspond to one of the light emitting layers 2 in the slow axis direction X.

The incident-side lens surfaces 111a each have, in X-Z section, a shape convexed toward the outside of the SAC/FAC 11 as illustrated in FIG. 7 and, in Y-Z section, a shape concaved toward the inside of the SAC/FAC 11 as illustrated in FIG. 8. This makes the first incident surface 111 a surface having the function of collimating beams of laser light 3 in the slow axis direction X.

In X-Z section, the distance from the emission end surfaces 2a of the light emitting layers 2 to the first incident surface 111 is equal to the focal distance fs of each incident-side lens surface 111a as illustrated in FIG. 7. In other words, the emission end surface 2a of each light emitting layer 2 is positioned at the focal position of one of the incident-side lens surfaces 111a, and the laser light 3 emitted from the emission end surface 2a is collimated in the slow axis direction X by the incident-side lens surface 111a of the first incident surface 111.

The shape of the first incident surface 111 in Y-Z section is an arc having a point on the emission end surface 2a of one of the light emitting layers 2 as the center as illustrated in FIG. 8. This causes the laser light 3 emitted from the emission end surface 2a to be transmitted through the first incident surface 111 as it is without being refracted in Y-Z section. In other words, no aberration occurs in each beam of laser light 3 transmitted through the first incident surface 111 in Y-Z section. The curvature radius Rc of the first incident surface 111 in Y-Z section is equal to the focal distance fs of each incident-side lens surface 111a.

The first exit surface 112, on the other hand, is a surface having the same function as that of the FAC 7 in the first embodiment. The first exit surface 112 is shaped so as to be linear in X-Z section as illustrated in FIG. 7 and so as to be convexed toward the outside of the SAC/FAC 11 in Y-Z section as illustrated in FIG. 8. In other words, the first exit surface 112 is a single lens surface convexed toward the outside of the SAC/FAC 11 and shaped like a cylinder with a generating line running along the slow axis direction X.

Beams of laser light 3 entering the SAC/FAC 11 from the first incident surface 111 accordingly exit from the SAC/FAC 11 without being refracted by the first exit surface 112 in X-Z section and, in Y-Z section, are collimated by the first exit surface 112 before exiting from the SAC/FAC 11. In other words, beams of laser light 3 entering the SAC/FAC 11 from the first incident surface 111 are collimated in the fast axis direction Y by the first exit surface 112 when passing through the first exit surface 112. In order to collimate the beams of laser light 3 with precision by the first exit surface 112 in the fast axis direction Y, in which the divergence angle is large, in particular, the first exit surface 112 is given a non-arc shape instead of a simple arc shape in Y-Z section. A desirable shape of the first exit surface 112 in Y-Z section is an ellipse whose major axis matches the optical axis direction Z. When the shape of the first exit surface 112 in Y-Z section is an ellipse whose major axis matches the optical axis direction Z, the laser light 3 can be collimated with precision by the first exit surface 112.

In the beam shaping device 5, when the refractive index of the SAC/FAC 11 is higher, the curvature of the first exit surface 112 is smaller and an exit angle at which the laser light 3 exits from the first exit surface 112 (i.e., an angle between the laser light 3 collimated by the first exit surface 112 and a surface normal to the first exit surface 112) is smaller. When the exit angle at which the laser light 3 exits from the first exit surface 112 is small, the laser light 3 undergoes a smaller loss at the first exit surface 112, which is why the SAC/FAC 11 is preferred to have a high refractive index. The refractive index of the SAC/FAC 11 is 1.7 or higher in this example. The rest of the configuration is the same as in the first embodiment.

In the thus configured beam shaping device 5, the first incident surface 111 of the SAC/FAC 11 is shaped in Y-Z section like an arc having a point on the emission end surface 2a of one of the light emitting layers 2 as the center, the first exit surface 112 of the SAC/FAC 11 has a non-arc shape in Y-Z section, and the first incident surface 111 of the SAC/FAC 11 forms a lens array in which the plurality of incident-side lens surfaces 111a are aligned in the slow axis direction X. The beam shaping device 5 is accordingly capable of collimating, out of beams of laser light 3 emitted from the emission end surfaces 2a of the respective light emitting layers 2, a beam of laser light 3 in the slow axis direction X by the first incident surface 111, and a beam of laser light 3 in the fast axis direction Y by the first exit surface 112. The laser light 3 can thus be collimated by a single SAC/FAC 11 in the slow axis direction X and the fast axis direction Y both, which helps to reduce the number of parts. With the laser light 3 collimated by a single SAC/FAC 11, the need for the positioning work and the fixing work, which are performed in the first embodiment and the second embodiment to position and fix the SAC 6 and the FAC 7 with respect to each other, is eliminated as well, thereby reducing man-hours and cost. While the laser light 3 is transmitted through four surfaces, namely, the first incident surface 61, the first exit surface 62, the second incident surface 71, and the second exit surface 72, in the beam shaping devices 5 according to the first embodiment and the second embodiment, which include the SAC 6 and the FAC 7, the laser light 3 in the third embodiment is transmitted through only two surfaces, namely, the first incident surface 111 and first exit surface 112 of the SAC/FAC 11. The reduced number of surfaces through which the laser light 3 is transmitted makes the utilization efficiency of the laser light 3 in the third embodiment even higher than in the first embodiment and the second embodiment.

In addition, the first exit surface 112 of the SAC/FAC 11, which has a refractive index of 1.7 or higher, can have a small curvature, and the loss of the laser light 3 at the first exit surface 112 can accordingly be reduced.

The SAC/FAC 11 is formed by press molding with the use of a mold. An error in the position of the first exit surface 112 in relation to the first incident surface 111 can therefore be made very small, which renders beam shaping by the SAC/FAC 11 highly precise.

While the pair of seats 63 described in the second embodiment is not formed in the SAC/FAC 11 in the example given above, the pair of seats 63 may protrude toward the LD bar 1 side from two end portions of the SAC/FAC 11 in the fast axis direction Y. In this case, the pair of seats 63 and the SAC/FAC 11 are formed unitarily, with no boundaries between the pair of seats 63 and the SAC/FAC 11. In this way, the SAC/FAC 11 is easy to manufacture and handle as in the second embodiment and, by fixing the end surface 63a of one of the seats 63 to the end surface 10a of the heat sink 10, to which the LD bar 1 is fixed, the SAC/FAC 11 can be positioned easily and more accurately in relation to the LD bar 1.

As in the second embodiment, the pair of incident-side tapered surfaces 65 slanted in the optical axis direction Z may be formed in the SAC/FAC 11 in the example described above. The pair of incident-side tapered surfaces 65 in this case is formed on each side of the first incident surface 111 in the slow axis direction X. The pair of incident-side tapered surfaces 65 in this case is also formed in the SAC/FAC 11 so that the distance between the pair of incident-side tapered surfaces 65 in X-Z section increases continuously toward the LD bar 1 as the distance from the first incident surface 111 becomes longer.

Fourth Embodiment

Figure 9:
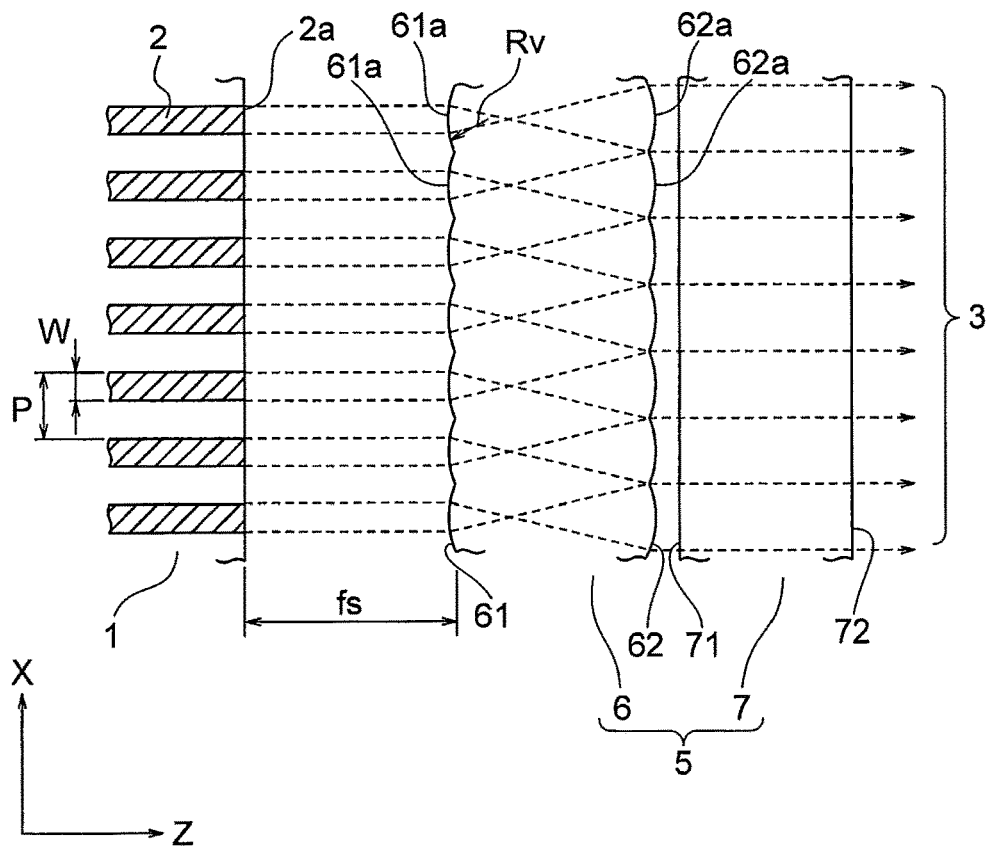
FIG. 9 is a sectional view for illustrating how a beam shaping device according to a fourth embodiment of the present invention and an LD bar in the fourth embodiment look when cut along the X-Z plane, which is orthogonal to the fast axis direction Y of light emitting layers.
Figure 10:
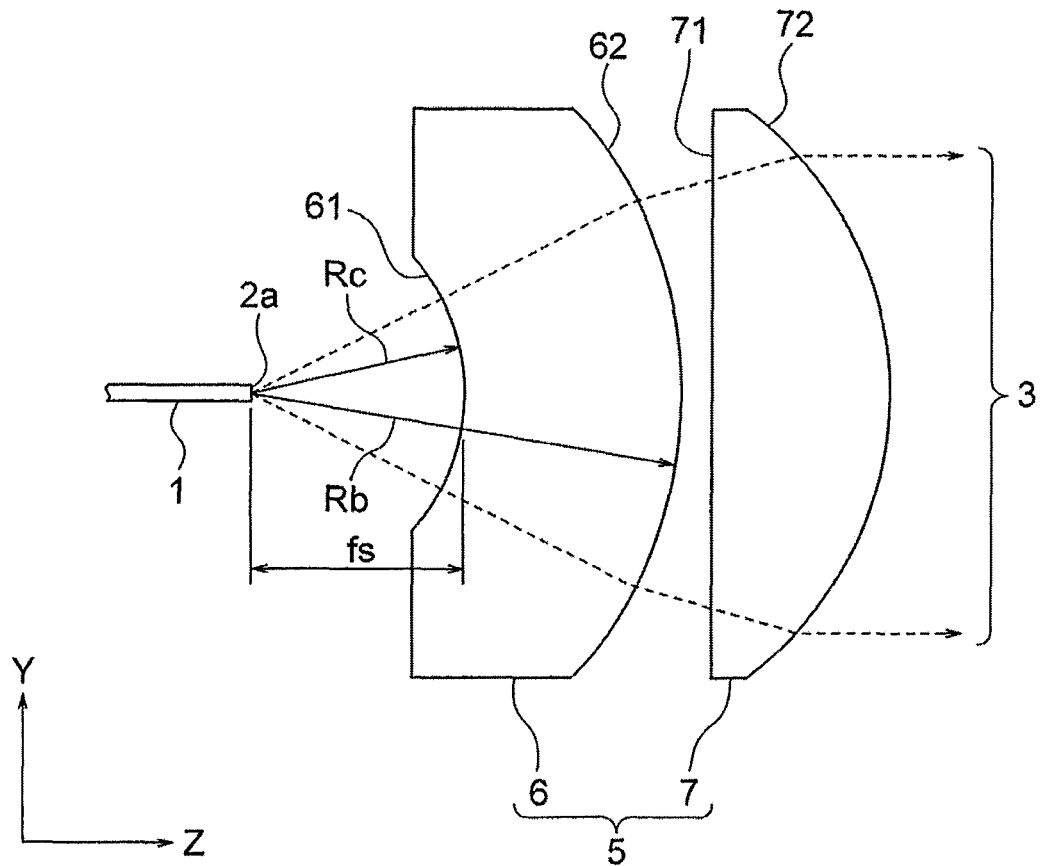
FIG. 10 is a sectional view for illustrating how the beam shaping device and LD bar of FIG. 9 look when cut along the Y-Z plane, which is orthogonal to the slow axis direction X of light emitting layers.

FIG. 9 is a sectional view for illustrating how a beam shaping device according to a fourth embodiment of the present invention and an LD bar in the fourth embodiment look when cut along the X-Z plane, which is orthogonal to the fast axis direction Y of light emitting layers. FIG. 10 is a sectional view for illustrating how the beam shaping device and LD bar of FIG. 9 look when cut along the Y-Z plane, which is orthogonal to the slow axis direction X of light emitting layers. The first exit surface 62 is a micro lens array in which a plurality of exit-side lens surfaces 62a are aligned in the slow-axis direction X of the light emitting layers 2. Each exit-side lens surface 62a is positioned so as to correspond to one of the incident-side lens surfaces 61a of the first incident surface 61 in the slow axis direction X.

The exit-side lens surfaces 62a each have, in X-Z section, a shape convexed toward the outside of the SAC 6 as illustrated in FIG. 9 and, in Y-Z section, a shape convexed toward the outside of the SAC 6 as illustrated in FIG. 10. The curvature radius of each exit-side lens surface 62a in X-Z section differs from the curvature radius of each incident-side lens surface 61a in X-Z section. The shape of the first incident surface 61 and the shape of the first exit surface 62 in Y-Z section are, as in the first embodiment and the second embodiment, concentric arcs having a point on the emission end surface 2a of one of the light emitting layers 2 as the center.

In the fourth embodiment, the first incident surface 61 of the SAC 6 is the same surface as the first incident surface 61 in the first embodiment, and the focal distance fs of each incident-side lens surface 61a, too, is the same as in the first embodiment. Each exit-side lens surface 62a in the fourth embodiment has, in X-Z section, a focal distance calculated by fs×P/W, and a curvature radius Ru expressed by Ru=Rv× P/W. The distance between one of the incident-side lens surfaces 61a and its corresponding exit-side lens surface 62a in X-Z section in the fourth embodiment is expressed as n×fs×(1+P/W), where n represents the refractive index of the SAC 6. The rest of the configuration is the same as in the first embodiment.

In the beam shaping device 5 according to the first embodiment, the residual divergence angle of the laser light 3 transmitted through the SAC 6 increases in the slow axis direction X as the proportion of the width W of each light emitting layer 2 in the LD bar 1 to the pitch P between the light emitting layers 2, namely, the fill factor F (F=W/P) increases. When the fill factor F exceeds 50%, in particular, the residual divergence angle of the laser light 3 transmitted through the SAC 6 becomes larger than the divergence angle of the laser light 3 at the time of emission from the end surfaces 2a of the light emitting layers 2. In contrast, the residual divergence angle of the laser light 3 transmitted through the SAC 6 is small in the beam shaping device 5 according to the fourth embodiment due to the fact that the first exit surface 62 is a lens array in which the plurality of exit-side lens surfaces 62a are aligned in the slow axis direction X of the light emitting layers 2.

Figure 11:
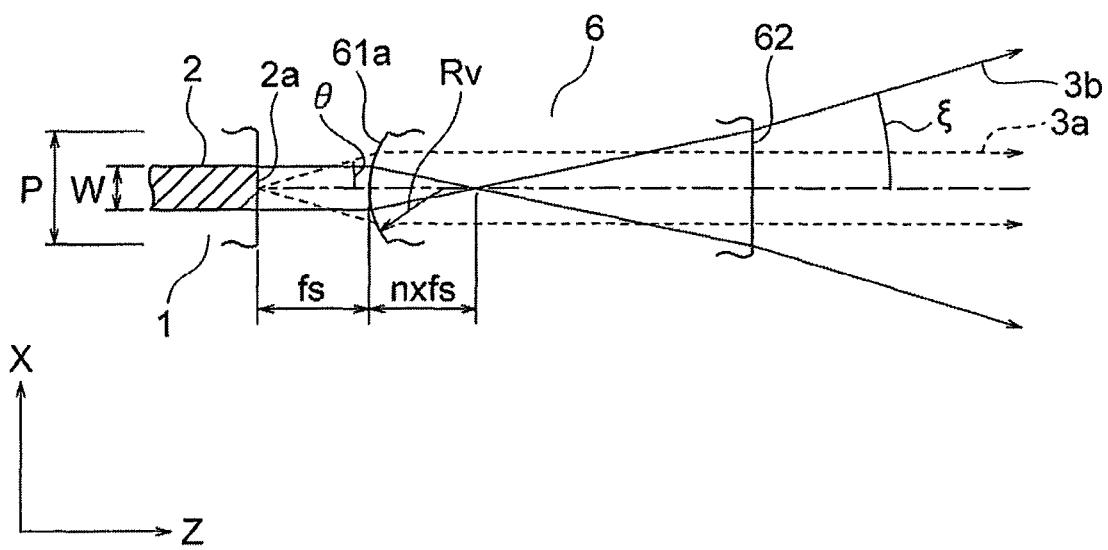
FIG. 11 is an enlarged sectional view for illustrating one of light emitting layers of FIG. 2 and a portion of an SAC that is opposed to the one of the light emitting layers in an optical axis direction Z.
Figure 12:
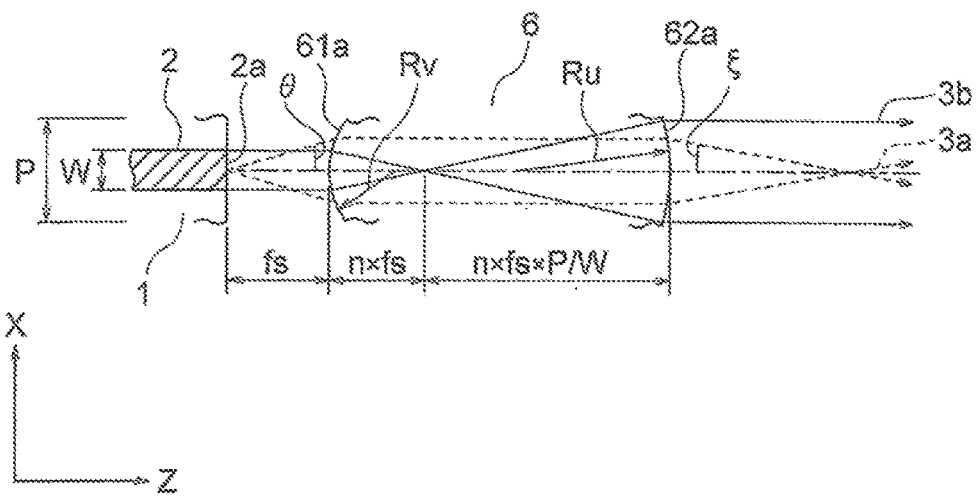
FIG. 12 is an enlarged sectional view for illustrating one of the light emitting layers of FIG. 9 and a portion of an SAC that is opposed to the one of the light emitting layers in the optical axis direction Z.

FIG. 11 is an enlarged sectional view for illustrating one of the light emitting layers 2 of FIG. 2 and a portion of the SAC 6 that is opposed to the one of the light emitting layers 2 in the optical axis direction Z. FIG. 12 is an enlarged sectional view for illustrating one of the light emitting layers 2 of FIG. 9 and a portion of the SAC 6 that is opposed to the one of the light emitting layers 2 in the optical axis direction Z. A residual divergence angle ξ of the laser light 3 transmitted through the SAC 6 of the beam shaping device 5 according to the first embodiment in the slow axis direction X is illustrated in FIG. 11. A residual divergence angle ξ of the laser light 3 transmitted through the SAC 6 of the beam shaping device 5 according to the fourth embodiment in the slow axis direction X is illustrated in FIG. 12.

In the first embodiment illustrated in FIG. 11, laser light 3a (broken lines) emitted at the divergence angle θ from a point at the center of the emission end surface 2a of the light emitting layer 2 is collimated by one of the incident-side lens surfaces 61a of the SAC 6. The residual divergence angle ξ in the first embodiment is accordingly caused in X-Z section by beams of laser light 3b (solid lines) emitted in parallel from points at the two ends of the width W of the light emitting layer 2. When the refractive index of the SAC 6 is given as n in the first embodiment, the beams of laser light 3b emitted in parallel from the points at the two ends of the width W of the light emitting layer 2 intersect once at a point identified by the product of the focal distance fs of the incident-side lens surface 61a and the refractive index n of the SAC 6 (n×fs), and then diverge without any changes as illustrated in FIG. 11. The residual divergence angle ξ in this case is expressed as ξ=F/(1−F)×θ when the focal distance fs is expressed as fs=(P−W)/2θ.

In the fourth embodiment illustrated in FIG. 12, on the other hand, beams of laser light 3b (solid lines) emitted in parallel from points at the two ends of the width W of the light emitting layer 2 spread to the full extent of the pitch P between the light emitting layers 2 at the position of the exit-side lens surface 62a, and are collimated by the exit-side lens surface 62a. The residual divergence angle in the fourth embodiment is accordingly caused in X-Z section by beams of laser light 3a (broken lines) emitted at the divergence angle θ from a point at the center of the emission end surface 2a of the light emitting layer 2. The residual divergence angle ξ caused by beams of laser light 3a emitted at the divergence angle θ from a point at the center of the emission end surface 2a of the light emitting layer 2 is expressed as ξ=F×θ in the fourth embodiment.

Figure 13:
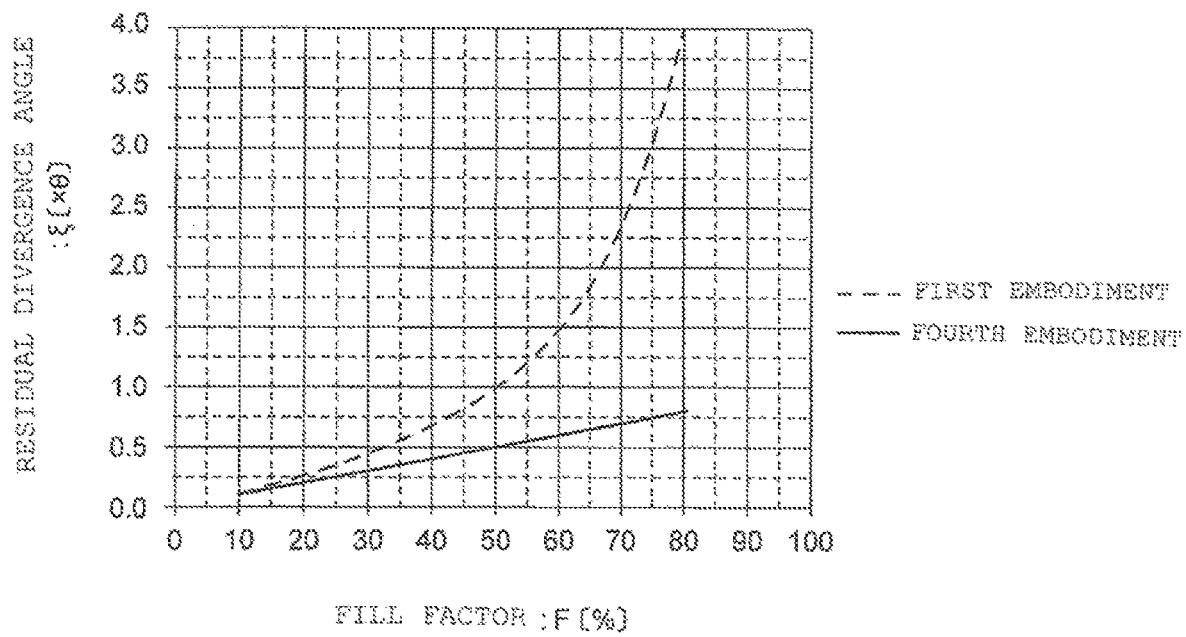
FIG. 13 is a graph in which the relationship between a residual divergence angle and a fill factor F in the slow axis direction X is compared between the first embodiment and the fourth embodiment.

FIG. 13 is a graph in which the relationship between the residual divergence angle ζ and the fill factor F in the slow axis direction X is compared between the first embodiment and the fourth embodiment. In FIG. 13, the residual divergence angle ξ is shown on the axis of ordinate as a multiple of the divergence angle θ at the emission end surface 2a of the light emitting layer 2. The solid line in FIG. 13 represents the relationship between the residual divergence angle ξ and the fill factor F in the fourth embodiment, and the broken line in FIG. 13 represents the relationship between the residual divergence angle ξ and the fill factor F in the first embodiment.

It is understood from FIG. 13 that the residual divergence angle ξ is smaller in the fourth embodiment than in the first embodiment. It is also understood that an increase in residual divergence angle ξ is kept smaller in the fourth embodiment than in the first embodiment despite an increase in the value of the fill factor F.

In the thus configured beam shaping device 5, the first exit surface 62 of the SAC 6 has the plurality of exit-side lens surfaces 62a aligned in the slow axis direction X of the light emitting layers 2, and the exit-side lens surfaces 62a each have, in X-Z section, a shape convexed toward the outside of the SAC 6 and, in Y-Z section, a shape convexed toward the outside of the SAC 6. The residual divergence angle ξ of the laser light 3 can accordingly be made smaller than in the first embodiment. This reduces the loss of the laser light 3 after the laser light 3 is transmitted through the SAC 6, thereby raising the utilization efficiency of the laser light 3 even higher.

The focal distance of each exit-side lens surface 62a, which is expressed by fs×P/W in the example described above, is not limited thereto, and the residual divergence angle ξ can be made smaller than in the first embodiment as long as the shape of each exit-side lens surface 62a in X-Z section is a shape convexed toward the outside of the SAC 6.

While the pair of seats 63 described in the second embodiment is not formed in the SAC 6 in the example given above, the pair of seats 63 may protrude toward the LD bar 1 side from two end portions of the SAC 6 in the fast axis direction Y. In this case, the pair of seats 63 and the SAC 6 are formed unitarily, with no boundaries between the pair of seats 63 and the SAC 6. In this way, the SAC 6 is made easy to manufacture and handle, and the SAC 6 can be positioned easily and more accurately in relation to the LD bar 1.

As in the second embodiment, the pair of seats 73 and the pair of recessed portions 64 may be included in the example described above so that the pair of seats 73 protrudes toward the SAC 6 side from two end portions of the FAC 7 in the fast axis direction Y and fits in the pair of recessed portions 64 formed in the SAC 6. In this case, the pair of seats 73 and the FAC 7 are formed unitarily, with no boundaries between the pair of seats 73 and the FAC 7. In this way, the FAC 7 is made easy to manufacture and handle, and the FAC 7 can be positioned easily and more accurately in relation to the SAC 6.

As in the second embodiment, the pair of incident-side tapered surfaces 65 slanted in the optical axis direction Z may be formed in the SAC 6 in the example described above. The pair of incident-side tapered surfaces 65 in this case is formed on each side of the first incident surface 61 in the slow axis direction X. The pair of incident-side tapered surfaces 65 in this case is also formed in the SAC 6 so that the distance between the pair of incident-side tapered surfaces 65 in X-Z section increases continuously toward the LD bar 1 side as the distance from the first incident surface 61 becomes longer.

Fifth Embodiment

Figure 14:
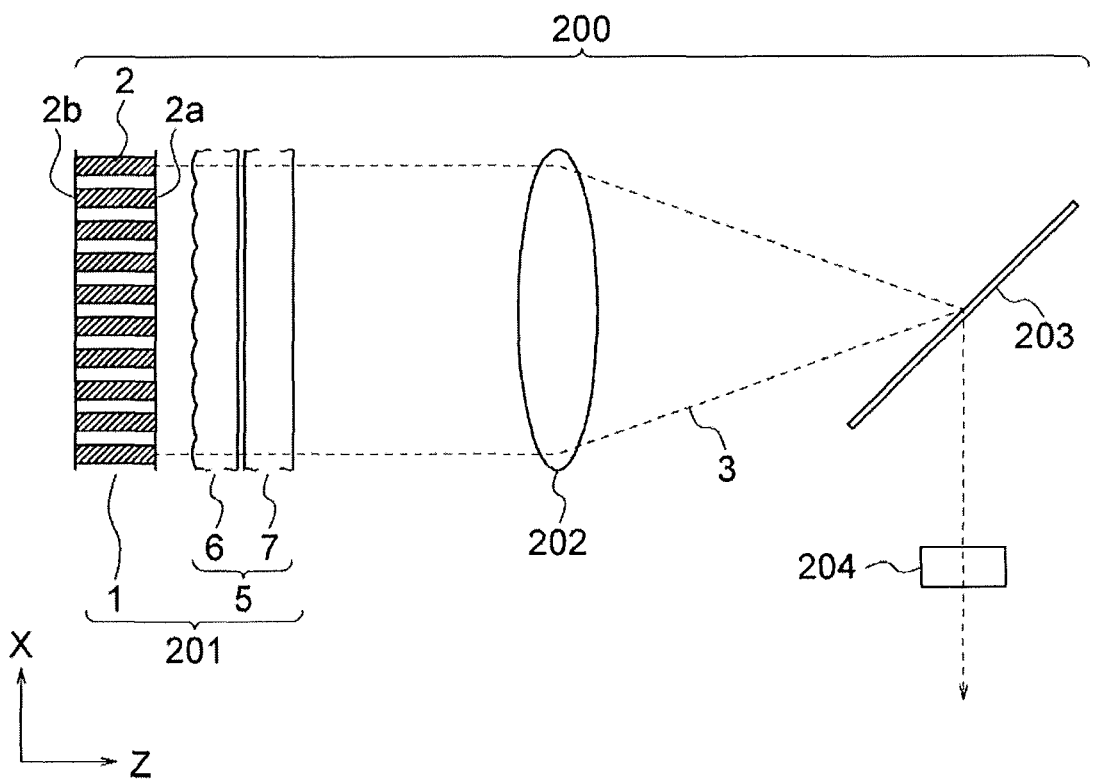
FIG. 14 is a view of how a laser oscillator according to a fifth embodiment of the present invention looks when viewed along the fast axis direction Y of light emitting layers.

FIG. 14 is a view of how a laser oscillator according to a fifth embodiment of the present invention looks when viewed along the fast axis direction Y of light emitting layers. A laser oscillator 200 is a wavelength coupling-type laser oscillator in which a beam supply device 201 configured to supply a plurality of collimated beams of laser light 3 is provided with an external resonator structure. Specifically, the laser oscillator 200 includes the beam supply device 201, a light collecting element 202, a wavelength coupling element 203, and a partial reflection mirror 204. The light collecting element 202 is placed between the beam supply device 201 and the partial reflection mirror 204 in the travel direction of beams of laser light 3. The wavelength coupling element 203 is placed between the light collecting element 202 and the partial reflection mirror 204 in the travel direction of beams of laser light 3.

The beam supply device 201 includes the LD bar 1 and the beam shaping device 5. The LD bar 1 and the beam shaping device 5 are configured and arranged in the same way as in the first embodiment. End surfaces of the light emitting layers 2 on the side opposite from the emission end surfaces 2a are reflective end surfaces 2b, which reflect the laser light 3. Beams of laser light 3 emitted from the emission end surfaces 2a of the LD bar 1 are collimated by the beam shaping device 5, and then travel to the light collecting element 202.

The light collecting element 202 again collimates, that is, parallelize, the beams of laser light 3 spreading from the beam supply device 201 due to diffraction, and also collects principal rays of the beams of laser light 3 to one point on the wavelength coupling element 203. The light collecting element 202 can be, for example, a lens having a convex power at least in the slow axis direction X.

The wavelength coupling element 203 is, for example, a diffraction grating. The wavelength coupling element 203 diffracts, to a primary diffraction direction, for example, beams of laser light 3 after principal rays of the beams of laser light 3 are collected by the light collecting element 202 to one point.

The partial reflection mirror 204 reflects part of the beams of laser light 3 diffracted by the wavelength coupling element 203 to a direction reverse to the travel direction of the beams of laser light 3, and transmits the rest of the beams of laser light 3.

The beams of laser light 3 reflected by the partial reflection mirror 204 trace back, in the reverse direction, a light path along which the beams of laser light 3 have traveled, to thereby pass through the wavelength coupling element 203, the light collecting element 202, and the beam shaping device 5 in the stated order, and return to their respective light emitting layers 2 from which the beams of laser light 3 have been emitted. The beams of laser light 3 returned to the light emitting layers 2 travel inside the light emitting layers 2 to be reflected by the reflective end surfaces 2b, and are then emitted from the emission end surfaces 2a of the light emitting layers 2 to again pass through the beam shaping device 5, the light collecting element 202, and the wavelength coupling element 203 in the stated order, and reach the partial reflection mirror 204. In other words, the laser oscillator 200 is a resonator in which the light emitting layers 2 are used as an oscillation source that is a gain medium, and the laser light 3 is resonated between the reflective end surfaces 2b of the light emitting layers 2 and the partial reflection mirror 204.

An incident angle at which the laser light 3 emitted from one of the light emitting layers 2 enters the wavelength coupling element 203 is determined based on the positions of the LD bar 1, the light collecting element 202, and the wavelength coupling element 203, or other factors. The exit angle of the laser light 3 diffracted by the wavelength coupling element 203, namely, the laser light 3 exiting from the wavelength coupling element 203, on the other hand, is determined so that the laser light 3 vertically enters and is vertically reflected by the partial reflection mirror 204. By determining from the incident angle and the exit angle a certain value as the wavelength, a wavelength at which oscillation can be performed in the laser oscillator 200 is selected automatically, and the laser light 3 having the selected wavelength is oscillated by and output from the laser oscillator 200.

Beams of laser light 3 emitted from the light emitting layers 2 differ from one another a little in wavelength, and the wavelengths of the beams of laser light 3 vary by stages along the slow axis direction X. The laser light 3 traveling between the wavelength coupling element 203 and the partial reflection mirror 204 is a single beam of laser light into which beams of laser light having a plurality of wavelengths are superimposed. This makes laser light transmitted through the partial reflection mirror 204 and exiting from the laser oscillator 200 a single beam of multi-wavelength laser light.

The thus configured laser oscillator 200, which uses the beam shaping device 5 according to the first embodiment, is easy to handle and manufacture, can be reduced in cost, and can raise the utilization efficiency of the laser light 3. In addition, any length can be selected as the focal distance of the FAC 7 and, by setting a long focal distance to the FAC 7, the adjustment sensitivity of the laser oscillator 200 can be lowered. This makes the resultant laser oscillator 200 stable and impervious to a temperature change and other disturbances.

Sixth Embodiment

Figure 15:
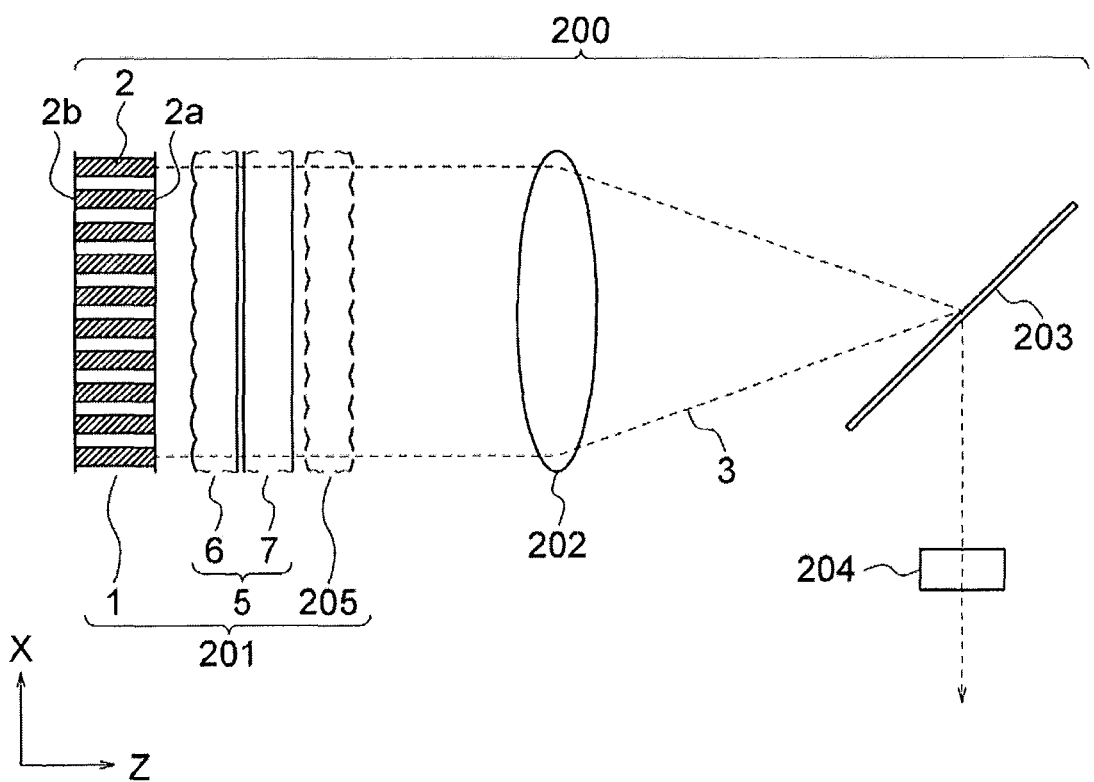
FIG. 15 is a view of how a laser oscillator according to a sixth embodiment of the present invention looks when viewed along the fast axis direction Y of light emitting layers.

FIG. 15 is a view of how a laser oscillator according to a sixth embodiment of the present invention looks when viewed along the fast axis direction Y of light emitting layers. The beam supply device 201 includes the LD bar 1, the beam shaping device 5, and a light path conversion element 205. The LD bar 1 and the beam shaping device 5 are configured and arranged in the same way as in the first embodiment. The light path conversion element 205 is placed between the beam shaping device 5 and the light collecting element 202 in the travel direction of beams of laser light 3.

Figure 16:
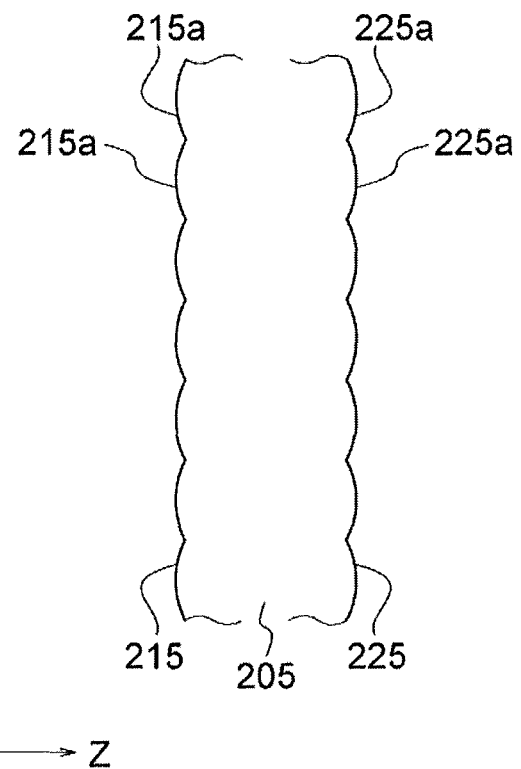
FIG. 16 is a sectional view for illustrating how a light path conversion element of FIG. 15 looks when cut along the X-Z plane, which is orthogonal to the fast axis direction Y.
Figure 17:
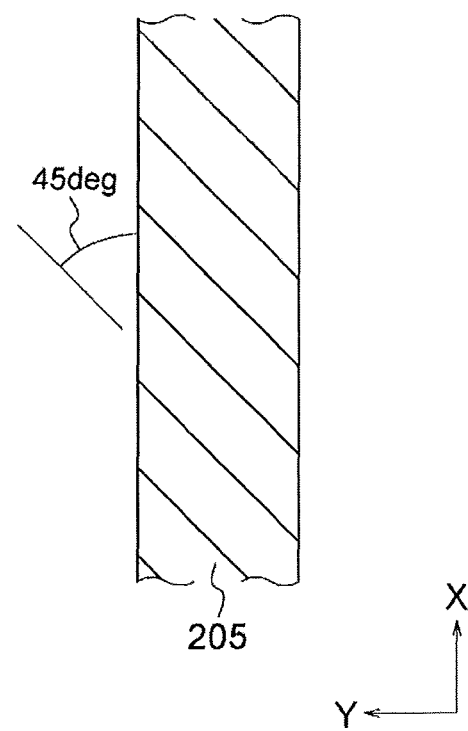
FIG. 17 is a view of how the light path conversion element of FIG. 15 looks when viewed along the optical axis direction Z.

FIG. 16 is a sectional view for illustrating how the light path conversion element 205 of FIG. 15 looks when cut along the X-Z plane, which is orthogonal to the fast axis direction Y. FIG. 17 is a view of how the light path conversion element 205 of FIG. 15 looks when viewed along the optical axis direction Z. An element incident surface 215, which beams of laser light 3 enter, and an element exit surface 225, from which the beams of laser light 3 having entered the light path conversion element 205 exit, are formed in the light path conversion element 205. The light path conversion element 205 is arranged so that the element incident surface 215 faces the beam shaping device 5, and so that the element exit surface 225 faces the side opposite from the beam shaping device 5, namely, the wavelength coupling element 203.

The element incident surface 215 is a micro lens array in which a plurality of incident-side lens surfaces 215a are aligned in the slow axis direction X of the light emitting layers 2. The element exit surface 225 is a micro lens array in which a plurality of exit-side lens surfaces 225a are aligned in the slow axis direction X of the light emitting layers 2. The incident-side lens surfaces 215a and the exit-side lens surfaces 225a are positioned so that one incident-side lens surface 215a and one exit-side lens surface 225a correspond to each other in the slow axis direction X. The shape of each incident-side lens surface 215a and the shape of each exit-side lens surface 225a are the same as each other. Each incident-side lens surface 215a and each exit-side lens surface 225a are shaped like a cylinder with a generating line running along a 45-deg direction in the X-Y plane. This gives each incident-side lens surface 215a and each exit-side lens surface 225a an arc shape or non-arc shape convexed toward the outside of the light path conversion element 205 in section perpendicular to the generating line.

The slow axis direction and fast axis direction of a flux of light entering the light path conversion element 205 from the element incident surface 215 are switched by the light path conversion element 205, and the flux of light then exits from the light path conversion element 205 from the element exit surface 225. Specifically, the light path conversion element 205 switches the slow axis direction and fast axis direction of the laser light 3 by rotating the laser light 3 about the optical axis direction Z only by 90 deg. This gives the laser light 3 a slow axis direction that matches the X-direction before the laser light 3 enters the light path conversion element 205 and that matches the Y-direction after the laser light 3 exits from the light path conversion element 205. This also gives the laser light 3 a fast axis direction that matches the Y-direction before the laser light 3 enters the light path conversion element 205 and that matches the X-direction after the laser light 3 exits from the light path conversion element 205. Each beam of laser light 3 from the beam shaping device 5 reaches the light collecting element 202 after its slow axis direction and fast axis direction are switched by the light path conversion element 205. The rest of the configuration is the same as in the fifth embodiment.

In the thus configured laser oscillator 200, the beam supply device 201 includes the light path conversion element 205 placed between the beam shaping device 5 and the light collecting element 202, and each beam of laser light 3 from the beam shaping device 5 can accordingly be caused to enter the light collecting element 202 with its slow axis direction and fast axis direction switched, which allows the laser oscillator 200 to be small in size. In addition, the slow axis direction and fast axis direction of each beam of laser light 3 can be switched accurately because the laser light 3 caused to enter the light path conversion element 205 is already collimated by the beam shaping device 5 in the slow axis direction and the fast axis direction both, with the result that high quality laser light 3 is output from the laser oscillator 200. Another effect of the laser light 3 being collimated by the beam shaping device 5 in the slow axis direction and the fast axis direction both before entering the light path conversion element 205 is that vignetting of the laser light 3 is prevented when the laser light 3 passes through the light path conversion element 205. Those effects make the resultant laser oscillator 200 high in the utilization efficiency of the laser light 3.

Seventh Embodiment

Figure 18:
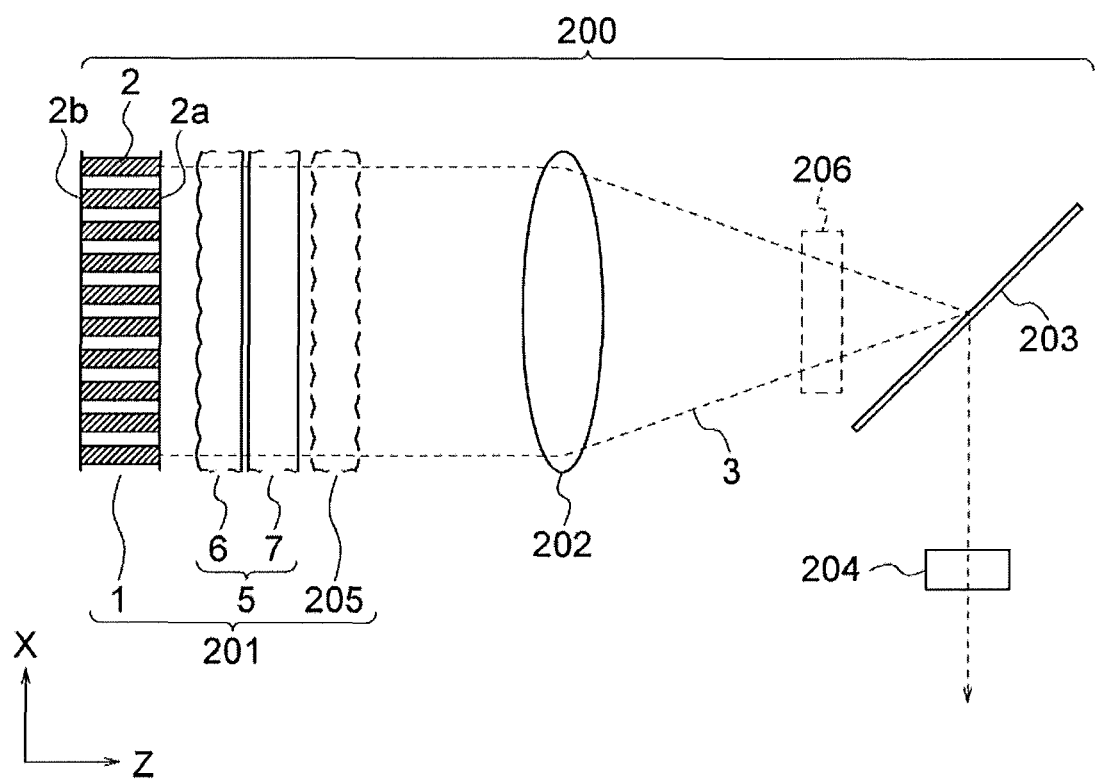
FIG. 18 is a view of how a laser oscillator according to a seventh embodiment of the present invention looks when viewed along the fast axis direction Y of light emitting layers.

FIG. 18 is a view of how a laser oscillator according to a seventh embodiment of the present invention looks when viewed along the fast axis direction Y of light emitting layers. While no optical system element is placed between the light collecting element 202 and the wavelength coupling element 203 in the sixth embodiment, a λ/2 plate (half-wave plate: HWP) 206 may be placed between the light collecting element 202 and the wavelength coupling element 203. The λ/2 plate 206 rotates the polarization direction of each beam of laser light 3 about the optical axis direction Z only by 90 deg. Specifically, beams of laser light 3 emitted from the light emitting layers 2 each enter the wavelength coupling element 203 after the polarization direction of the beam of laser light 3 is rotated about the optical axis direction Z only by 90 deg by the λ/2 plate 206. The rest of the configuration is the same as in the sixth embodiment. This facilitates the raising of the diffraction efficiency for each beam of laser light 3 in the wavelength coupling element 203, which makes the utilization efficiency of the laser light 3 in the laser oscillator 200 even higher.

In the fifth embodiment to the seventh embodiment, the beam supply device 201 includes the beam shaping device 5 configured as described in the first embodiment, but may include the beam shaping device 5 configured as described in one of the second embodiment to the fourth embodiment.

While only one beam supply device 201 is included in the fifth embodiment to the seventh embodiment, a plurality of numbers of beam supply devices 201 may be included. In this case, each of the plurality of beam supply devices 201 is placed at a position at which principal rays of beams of laser light 3 are collected to one point on the wavelength coupling element 203. In this way, beams of laser light 3 from a plurality of LD bars 1 can be superimposed into a single beam of laser light, which means that the laser oscillator 200 having an even higher power can be obtained.

REFERENCE SIGNS LIST

1 LD bar, 2 light emitting layer (light emitting portion), 2a emission end surface, 3 laser light, 5 beam shaping device, 6 SAC (first collimator lens), 7 FAC (second collimator lens), 11 SAC/FAC (first collimator lens), 61 first incident surface, 61a incident-side lens surface, 62 first exit surface, 62a exit-side lens surface, 63 seat (attachment seat), 64 recessed portion, 64b recessed portion tapered surface, 65 incident-side tapered surface, 73 seat, 73b seat tapered surface, 111 first incident surface, 111a incident-side lens surface, 112 first exit surface, 200 laser oscillator, 201 beam supply device, 202 light collecting element, 203 wavelength coupling element, 204 partial reflection mirror, 205 light path conversion element, 206 λ/2 plate

The invention claimed is:
1. A beam shaping device, which is configured to collimate a plurality of beams of laser light, each of which is emitted from one of emission end surfaces of a plurality of light emitting portions aligned in a first direction in a light emission device toward an optical axis direction orthogonal to the first direction, the beam shaping device comprising:

a first collimator lens configured to collimate at least one of the plurality of beams of laser light that diverges in a slow axis direction, which is the first direction; and
a second collimator lens configured to collimate at least one of the plurality of beams of laser light that diverges in a fast axis direction, which is a second direction orthogonal to the optical axis direction and the first direction both,
wherein the first collimator lens is placed between the light emission device and the second collimator lens,
wherein the first collimator lens has formed therein a first incident surface, which the plurality of beams of laser light enter, and a first exit surface, from which the plurality of beams of laser light exit,
wherein the first incident surface includes a plurality of incident-side lens surfaces aligned in the first direction,
wherein the plurality of incident-side lens surfaces each have, in section orthogonal to the second direction, a shape convexed toward outside of the first collimator lens and, in section orthogonal to the first direction, a shape concaved toward inside of the first collimator lens, and
wherein a shape of the first incident surface and a shape of the first exit surface in section orthogonal to the first direction include concentric arcs having a point on the emission end surface of one of the plurality of light emitting portions as a center.

2. A beam shaping device according to claim 1,
wherein the second collimator lens has two end portions in the second direction from which a pair of seats protrudes toward the first collimator lens side,
wherein the first collimator lens has formed therein a pair of recessed portions in which the pair of seats is fit,
wherein the pair of seats has formed therein a pair of seat tapered surfaces opposed to each other in the second direction,
wherein a distance between the pair of seat tapered surfaces increases toward the first collimator lens, and
wherein the pair of recessed portions has formed therein recessed portion tapered surfaces contoured along the seat tapered surfaces.

3. A beam shaping device according to claim 1,
wherein the first exit surface includes a plurality of exit-side lens surfaces aligned in the first direction, and
wherein the plurality of exit-side lens surfaces each have, in section orthogonal to the second direction, a shape convexed toward the outside of the first collimator lens and, in section orthogonal to the first direction, a shape convexed toward the outside of the first collimator lens.

4. A beam shaping device, which is configured to collimate a plurality of beams of laser light, each of which is emitted from one of emission end surfaces of a plurality of light emitting portions aligned in a first direction in a light emission device toward an optical axis direction orthogonal to the first direction,
the beam shaping device comprising a first collimator lens configured to collimate at least one of the plurality of beams of laser light that diverges in a slow axis direction, which is the first direction and at least one of the plurality of beams of laser light that diverges in a fast axis direction, which is a second direction orthogonal to the optical axis direction and the first direction both,
wherein the first collimator lens has formed therein a first incident surface, which the plurality of beams of laser light enter, and a first exit surface, from which the plurality of beams of laser light exit, wherein the first incident surface includes a plurality of incident-side lens surfaces aligned in the first direction, wherein the plurality of incident-side lens surfaces each have, in section orthogonal to the second direction, a shape convexed toward outside of the first collimator lens and, in section orthogonal to the first direction, a shape concaved toward inside of the first collimator lens, and wherein a shape of the first exit surface in section orthogonal to the first direction includes a non-arc shape convexed toward the outside of the first collimator lens.

5. A beam shaping device according to claim 4, wherein the first collimator lens has a refractive index of 1.7 or higher.

6. A beam shaping device according to claim 1, wherein the first collimator lens has formed therein a pair of incident-side tapered surfaces, wherein the pair of incident-side tapered surfaces is situated on each side of the first incident surface in the first direction, and wherein, in section of the first collimator lens that is orthogonal to the second direction, the pair of incident-side tapered surfaces is slanted in the optical axis direction, and a distance between the pair of incident-side tapered surfaces increases continuously toward the light emission device (1) side as a distance from the first incident surface becomes longer.

7. A beam shaping device according to claim 4, wherein the first collimator lens has formed therein a pair of incident-side tapered surfaces, wherein the pair of incident-side tapered surfaces is situated on each side of the first incident surface in the first direction, and wherein, in section of the first collimator lens that is orthogonal to the second direction, the pair of incident-side tapered surfaces is slanted in the optical axis direction, and a distance between the pair of incident-side tapered surfaces increases continuously toward the light emission device side as a distance from the first incident surface becomes longer.

8. A beam shaping device according to claim 1, wherein the first collimator lens includes attachment seats, which protrude from the first collimator lens toward the light emission device side.

9. A beam shaping device according to claim 4, wherein the first collimator lens includes attachment seats, which protrude from the first collimator lens toward the light emission device side.

10. A laser oscillator, comprising:

a beam supply device including the light emission device and the beam shaping device of claim 1;

a light collecting element configured to collect the plurality of beams of laser light emitted from the beam supply device;

a wavelength coupling element configured to diffract the plurality of beams of laser light collected by the light collecting element; and a partial reflection mirror configured to reflect the plurality of beams of laser light diffracted by the wavelength coupling element, toward a direction reverse to a travel direction of the laser light.

11. A laser oscillator according to claim 10, further comprising a λ/2 plate placed between the light collecting element and the wavelength coupling element.

12. A laser oscillator according to claim 10, wherein the beam supply device includes a light path conversion element placed between the beam shaping device and the light collecting element and configured to switch the first direction and second direction of the laser light.

13. A laser oscillator according to claim 10, wherein the beam supply device includes a plurality of beam supply devices.

14. A laser oscillator, comprising:

a beam supply device including the light emission device and the beam shaping device of claim 4;

a light collecting element configured to collect the plurality of beams of laser light emitted from the beam supply device;

a wavelength coupling element configured to diffract the plurality of beams of laser light collected by the light collecting element; and a partial reflection mirror configured to reflect the plurality of beams of laser light diffracted by the wavelength coupling element, toward a direction reverse to a travel direction of the laser light.

15. A laser oscillator according to claim 14, further comprising a λ/2 plate placed between the light collecting element and the wavelength coupling element.

16. A laser oscillator according to claim 14, wherein the beam supply device includes a light path conversion element placed between the beam shaping device and the light collecting element and configured to switch the first direction and second direction of the laser light.

17. A laser oscillator according to claim 14, wherein the beam supply device includes a plurality of beam supply devices.

* * * * *